United States Patent
Liu et al.

(10) Patent No.: US 11,018,346 B2
(45) Date of Patent: May 25, 2021

(54) CATALYST COATING OF A PEROVSKITE FILM AND PARTICLES EXSOLUTED FROM THE PEROVSKITE FILM

(71) Applicant: Georgia Tech Research Corporation, Atlanta, GA (US)

(72) Inventors: Meilin Liu, Atlanta, GA (US); Dong Ding, Atlanta, GA (US); Yu Chen, Atlanta, GA (US); Lei Zhang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 65 days.

(21) Appl. No.: 16/096,318

(22) PCT Filed: Apr. 25, 2017

(86) PCT No.: PCT/US2017/029339
§ 371 (c)(1),
(2) Date: Oct. 25, 2018

(87) PCT Pub. No.: WO2017/189531
PCT Pub. Date: Nov. 2, 2017

(65) Prior Publication Data
US 2019/0140287 A1     May 9, 2019

Related U.S. Application Data

(60) Provisional application No. 62/326,886, filed on Apr. 25, 2016.

(51) Int. Cl.
*H01M 4/90*     (2006.01)
*H01M 4/86*     (2006.01)
*H01M 8/124*     (2016.01)

(52) U.S. Cl.
CPC ........ *H01M 4/9033* (2013.01); *H01M 4/8605* (2013.01); *H01M 2008/1293* (2013.01)

(58) Field of Classification Search
None
See application file for complete search history.

(56) References Cited

U.S. PATENT DOCUMENTS 8,802,316 B1* 8/2014 Liu ..................... H01M 8/1213
429/479
2010/0143818 A1   6/2010 Rieke et al.
(Continued)

OTHER PUBLICATIONS

Niu et al, High Performance Cobalt-Free Perovskite Cathode for Intermediate Temperature Solid Oxide Fuel Cells, 43 J. Mat. Sci. 9619-22 (Year: 2010).*

(Continued)

*Primary Examiner* — Yoshitoshi Takeuchi
(74) *Attorney, Agent, or Firm* — Troutman Pepper Hamilton Sanders LLP; Ryan A. Schneider

(57) ABSTRACT

A hybrid catalyst coating composed of a conformal thin film with exsoluted $PrO_x$ nano-particles. The conformal PNM thin film can be a perovskite composition of $PrNi_{0.5}Mn_{0.5}O_3$ (PNM). The $PrO_x$ nano-particles dramatically enhance the oxygen reduction reaction kinetics via a high concentration of oxygen vacancies while the thin PNM film effectively suppresses strontium segregation from the cathode of an intermediate-temperature solid oxide fuel cell.

33 Claims, 24 Drawing Sheets

(56) References Cited

U.S. PATENT DOCUMENTS

2014/0272622 A1 9/2014 Xing et al.
2015/0325860 A1* 11/2015 Ding .................. C01G 51/56
429/485

OTHER PUBLICATIONS

Li et al, Electrochemical Performance of Double Perovskite $Pr_2NiMnO_6$ as a Potential IT-SOFC cathode, v.40, Issue 37 Int'l J. of Hydrogen Energy, 12761-69 (Oct. 5, 2015). (Year: 2015).*
Kostogloudis et al, The Perovskite Oxide System $Pr_{1-x}Sr_xCo_{1-y}Mn_yO_{3-\delta}$: Crystal Structure and Thermal Expansion, vol. 18.14 J. Euro. Ceramic Soc. 2209-15 (1998). (Year: 1998).*
International Search Report & Written Opinion from PCT application No. PCT/US2017/029339 dated Jul. 12, 2017 (13 pages).
Niu, et al., "High performance cobalt-free perovskite cathode for intermediate temperature solid oxide fuel cells," Journal of Materials Chemistry Sep. 27, 2010.

* cited by examiner

CATALYST COATING OF A PEROVSKITE FILM AND PARTICLES EXSOLUTED FROM THE PEROVSKITE FILM

STATEMENT REGARDING FEDERALLY SPONSORED RESEARCH

This invention was made with government support under grant number DE-FE0026106 awarded by the Department of Energy. The government has certain rights in the invention.

BACKGROUND OF THE INVENTION

1. Field of the Invention

The present invention relates generally to solid oxide fuel cells and hybrid catalyst coatings, and more particularly to enhancing oxygen reduction reaction kinetics and durability of a fuel cell cathode by a hybrid catalyst coating composed of a conformal perovskite thin film with exsoluted praseodymium oxide nano-particles.

2. Description of Related Art

The demand for clean, secure, and economically competitive energy has stimulated great interest in fuel cells for efficient energy conversion. Among all types of fuel cells, solid oxide fuel cells (SOFCs) are the cleanest, most efficient chemical-to-electrical energy conversion systems with excellent fuel flexibility. However, broad commercialization of SOFC technology remains hampered by high cost and limited system lifetime.

The resistance from the oxygen reduction reaction (ORR) contributes the most to energy loss in the existing SOFCs, more so at lower temperatures. Therefore, a key technical opportunity to improve SOFC performance is to dramatically enhance ORR kinetics and durability of the cathode at low temperatures.

As one of the most promising cathode candidates for intermediate-temperature SOFCs, $La_{0.6}Sr_{0.4}Co_{0.2}Fe_{0.8}O_3$ (LSCF) has been extensively investigated because of its high electronic and ionic conductivities and good catalytic activity for ORR. However, LSCF displays a higher degradation rate than a $La_{1-x}Sr_xMnO_3$ (LSM) cathode, attributed to Sr segregation near surfaces or interfaces, caused by electrostatic attraction of the negatively charged A-site dopants near the positively charged oxygen vacancies enriched at the surface. The Sr-enriched phases (such as SrO islands on surface) are detrimental to the surface activity, and also promote the formation and growth of other detrimental secondary phases (e.g., $SrCO_3$, $Sr(OH)_2$, $SrCrO_4$, etc.), leading to time-dependent degradation in performance.

One path to improved fuel cell operation is to develop new cathode materials or architectures that are resistant to Sr-segregation. Sr-free cathode materials, for example, perovskite or Ruddlesden-Popper (RP) perovskite-like materials such as $La(Ni,Fe)O_{3-\delta}$, $Nd_2NiO_4$ and $Pr_2NiO_4$, have been studied as candidate SOFC cathode materials. To date, new cathode materials like these do not have all the desired properties: high ORR activity, suitable compatibility with other cell components (e.g., electrolyte and interconnect), and sufficient durability under realistic operating conditions.

Surface modifications with catalytically-active nano-particles have been used in chemical and electro-catalytic catalysis and SOFCs. However, discrete particles appear to have limited effect on suppressing Sr segregation. Recently, conformal perovskite coatings (e.g., $La_{0.85}Sr_{0.15}MnO_3$) have been deposited on a LSCF surface and shown to enhance performance and stability. When the crystal structure of the catalyst is similar to that of LSCF, the catalyst coating can be conformal and dense to effectively suppress Sr segregation and enhance the durability of the cathode. For a catalyst-coated LSCF electrode, the porous LSCF backbone serves as a "highway" for facile transport of both oxygen ions and electrons (or electron holes), while the thin catalyst coating offers enhanced ORR activity and durability.

It is thus an intention of the present invention to dramatically enhance both ORR kinetics and stability of state-of-the art LSCF cathode by applying a conformal coating of a hybrid catalyst derived from a one-step infiltration process. The desired catalyst layer should be conformal, highly active for ORR, and inert to contaminants encountered under realistic operating conditions.

BRIEF SUMMARY OF THE INVENTION

Briefly described, in an exemplary form, the present invention is an electrode comprising a mixed ionic-electronic conductor and an oxygen-reducing catalyst coating on at least a portion of the conductor, wherein the catalyst coating comprises a conformal perovskite film and particles exsoluted from the perovskite film.

The conformal perovskite film can comprise a composition of praseodymium, nickel, manganese and oxygen. The conformal perovskite film can comprise $PrNi_{0.5}Mn_{0.5}O_3$. The conformal perovskite film can comprise $Pr_2Ni_{0.5}Mn_{0.5}O_{4+\delta}$. The conformal perovskite film can comprises $Pr_{2-x}B_xNi_yMn_{1-y}O_{4+\delta}$, wherein $0 \leq x \leq 2$, and wherein $0 \leq y \leq 1$. The B can be replaced by Sr, Ca, or Ba. The conformal perovskite film can comprise $Pr_4Ni_2Mn_2O_{12}$. The conformal perovskite film can comprise $Pr_3Ni_2Mn_2O_{12}$.

The conformal perovskite film can comprise a composition of praseodymium, manganese, oxygen, an alkaline earth metal, and a transition metal. The alkaline earth metal can be selected from the group consisting of calcium, strontium, and barium. The transition metal can be selected from the group consisting of nickel, cobalt, and iron.

The particles exsoluted from the perovskite film can comprise $PrO_x$ nano-particles. The particles exsoluted from the perovskite film can comprise $PrO_2$ nano-particles. The particles exsoluted from the perovskite film can comprise $Pr_7O_{12}$ nano-particles.

The catalyst coating can have a thickness in a range from about 1 to about 50 nm. The catalyst coating can have a thickness in a range from about 1 to about 20 nm. The catalyst coating can be about 10 nm.

In another exemplary embodiment, the present invention is a solid oxide fuel cell comprising an anode, a cathode comprising an electrode comprising a mixed ionic-electronic conductor and an oxygen-reducing catalyst coating on at least a portion of the conductor, wherein the catalyst coating comprises a conformal perovskite film and particles exsoluted from the perovskite film, and an electrolyte adjacent the anode and the catalyst coating of the cathode.

At 750° C., the cathode can have a polarization resistance of less than 0.068 $\Omega cm^2$. At 750° C., the cathode can have a polarization resistance of approximately 0.022 $\Omega cm^2$.

The cathode can have a peak power density of greater than 0.88 $W/cm^2$. The cathode can have a peak power density of approximately 1.21 $W/cm^2$.

At 750° C., the cathode can have a surface exchange coefficient of greater than $5.7 \times 10^{-4}$ cm/s. At 750° C., the cathode can have a surface exchange coefficient in a range from about $7.50 \times 10^{-3}$ cm/s to about $1.77 \times 10^{-2}$ cm/s.

The conformal perovskite film can comprise a composition of praseodymium, nickel, manganese and oxygen. The conformal perovskite film can comprise $PrNi_{0.5}Mn_{0.5}O_3$. The conformal perovskite film can comprise $Pr_2Ni_{0.5}Mn_{0.5}O_{4+\delta}$. The conformal perovskite film can comprises $Pr_{2-x}B_xNi_yMn_{1-y}O_{4+\delta}$, wherein $0 \leq x \leq 2$, and wherein $0 \leq y \leq 1$. The B can be replaced by Sr, Ca, or Ba. The conformal perovskite film can comprise $Pr_4Ni_2Mn_2O_{12}$. The conformal perovskite film can comprise $Pr_3Ni_2Mn_2O_{12}$.

The conformal perovskite film can comprise a composition of praseodymium, manganese, oxygen, an alkaline earth metal, and a transition metal. The alkaline earth metal can be selected from the group consisting of calcium, strontium, and barium. The transition metal can be selected from the group consisting of nickel, cobalt, and iron.

The particles exsoluted from the perovskite film can comprise $PrO_x$ nano-particles. The particles exsoluted from the perovskite film can comprise $PrO_2$ nano-particles. The particles exsoluted from the perovskite film can comprise $Pr_7O_{12}$ nano-particles.

The catalyst coating can have a thickness in a range from about 1 to about 50 nm. The catalyst coating can have a thickness in a range from about 1 to about 20 nm. The catalyst coating can be about 10 nm.

In another exemplary embodiment, the present invention is a hybrid catalyst coating composed of a conformal thin film with exsoluted $PrO_x$ nano-particles. The conformal thin film can be a perovskite composition of $PrNi_{0.5}Mn_{0.5}O_3$ (PNM). The $PrO_x$ nano-particles dramatically enhance the ORR kinetics via a high concentration of oxygen vacancies while the thin PNM film effectively suppresses strontium segregation from the cathode of an intermediate-temperature solid oxide fuel cell. Thus, the inventive hybrid catalyst coating significantly enhances the stability of the cathode.

The present invention dramatically enhances ORR kinetics and durability of the state-of-the-art LSCF cathode, overcoming the conventional sluggish ORR that greatly reduces the energy efficiency of SOFCs. At 750° C., the present hybrid catalyst-coated LSCF cathode has a polarization resistance of ~0.022 $\Omega cm^2$, or about 17% of that for a bare LSCF cathode (~0.13 $\Omega cm^2$). Further, anode-supported cells with the present hybrid catalyst-coated LSCF cathode demonstrate remarkable peak power densities (~1.21 W/cm$^2$) while maintaining excellent durability (0.7 V for ~500 hours). Near ambient x-ray photoelectron spectroscopy (NAP-XPS) and near edge x-ray absorption fine structure (NEXAFS) analyses, together with density functional theory (DFT) calculations, indicate that the oxygen-vacancy-rich surfaces of $PrO_x$ nano-particles greatly accelerate the rate of electron transfer in the ORR, whereas the thin PNM film facilitates rapid oxide-ion transport while drastically enhancing surface stability of the LSCF electrode.

In another exemplary embodiment, the present invention dramatically enhances ORR kinetics and stability of the state-of-art LSCF cathode by applying an efficient electro-catalyst coating, $Pr_2Ni_{0.5}Mn_{0.5}O_{4+\delta}$, derived from a low cost one-step infiltration. The coatings on LSCF are composed of a conformal perovskite $PrNi_{0.5}Mn_{0.5}O_3$ (PNM) film and high-active $PrO_x$ nano-particles exsoluted from the PNM film. $PrO_x$ nano-particles with high oxygen vacancy concentration dramatically facilitate the ORR kinetics, while the conformal thin PNM film can rapidly transport oxygen ion to the LSCF surface as well as enhance the stability of cathode.

Other exemplary coatings comprise $Pr_{2-x}A_xA'_yMn_{1-y}O_{4+\delta}$, where x may vary from 0 to 2 and y from 0 to 1. A can be an alkaline earth metal, and A' can be a transition metal. In other exemplary embodiments, A is selected from the group consisting of Sr, Ca, and Ba, and A' is selected from the group consisting of Ni, Co, and Fe.

The present rationally-designed SOFC cathode significantly increases the ORR rate and enables durable output at operation conditions. Reducing SOFC degradation rate by catalyst coatings has been recognized by the community as the primary pathway for reducing SOFC cost and enabling commercialization of the technology.

Further, since intermediate-temperature solid oxide fuel cells (IT-SOFCs) have a potential to be the cleanest and most efficient options for cost-effective utilization of a wide variety of fuels—from hydrogen to hydrocarbons, coal gas, and renewable fuels—they are ideally suited for distributed generation (which may be integrated with smart grids) and for mobile applications (e.g., electric vehicles). To make IT-SOFCs economically competitive and commercially viable however, several material challenges must be overcome. One of them is the creation of durable, low-cost cathode materials and nanostructures of high electro-catalytic activity for ORR at intermediate temperatures. Thus, in another exemplary embodiment of the present invention, an effective strategy to fabricate high-performance hybrid catalyst coated electrodes of dramatically enhanced ORR activity and durability for fuel cells is disclosed. The concept of surface modification of electrode through solution-infiltration of a catalyst and the present unique hybrid electrode structure (exsoluted nano-particles on a conformal coating) are readily applicable to other energy storage and conversion systems, including metal-air batteries, supercapacitors, electrolyzers, dye-sensitized solar cells, and photo-catalysis.

These and other objects, features and advantages of the present invention will become more apparent upon reading the following specification in conjunction with the accompanying drawing figures.

For the electrical conductivity measurement, the experimental temperature was adjusted over the range from 300 to 900° C. At each temperature point, a cumulative current load was applied to the two current wires, and the corresponding voltage response on the two voltage wires was recorded with a potentiostat instrument and EG&G 5210 amplifier. Electrical conductivity values were then calculated from the slope of the obtained straight line. As for the determination of D and k, ECR was conducted between 550 and 750° C. at an interval of 50° C. The bars were first stabilized at the given temperatures for approximately one hour to ensure that they completely equilibrated with the surrounding atmosphere ($p_{O2}$=0.21 atm), which was then abruptly switched to an alternative atmosphere ($p_{O2}$=0.1 atm), thereby leading to a change in electrical conductivity. The change in conductivity with time was plotted as $[\sigma(t)-\sigma(0)]/[\sigma(\infty)-\sigma(0)]$. Oxygen surface exchange coefficient (k) was calculated from the ECR curves by ECRTOOLS.

Figure 10:
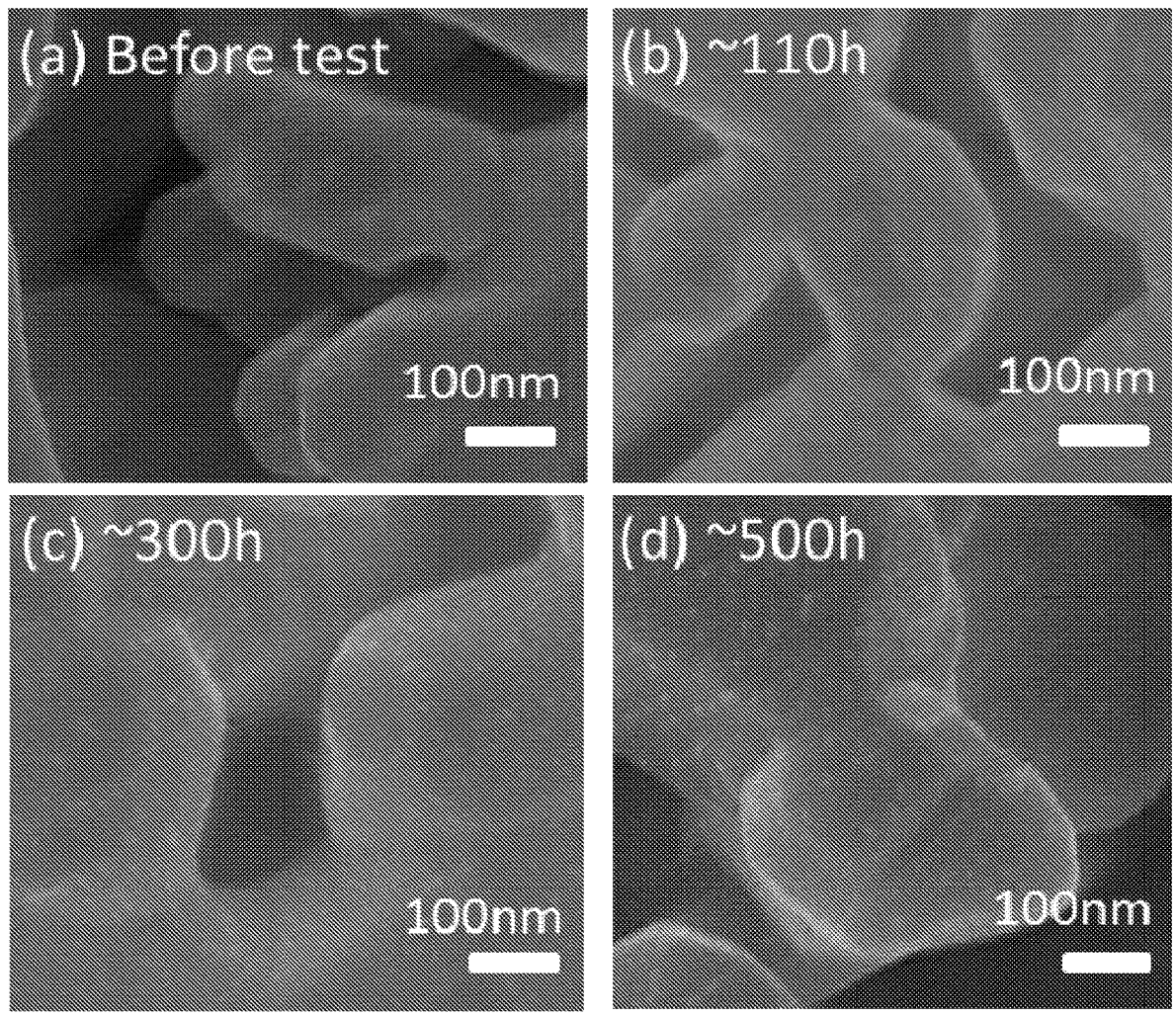

FIGS. 10(a)-(d) show the morphological evolution of the present hybrid catalyst coated LSCF cathode during the stability test at 750° C. at a cell voltage of 0.7 V as a function of operation time: FIG. 10(a) before test; FIG. 10(b) ~110 hours; FIG. 10(c) ~300 hours; and FIG. 10(d) ~500 hours. The essential morphological features remain unchanged, indicating reasonable stability of the electrodes.

Figure 11:
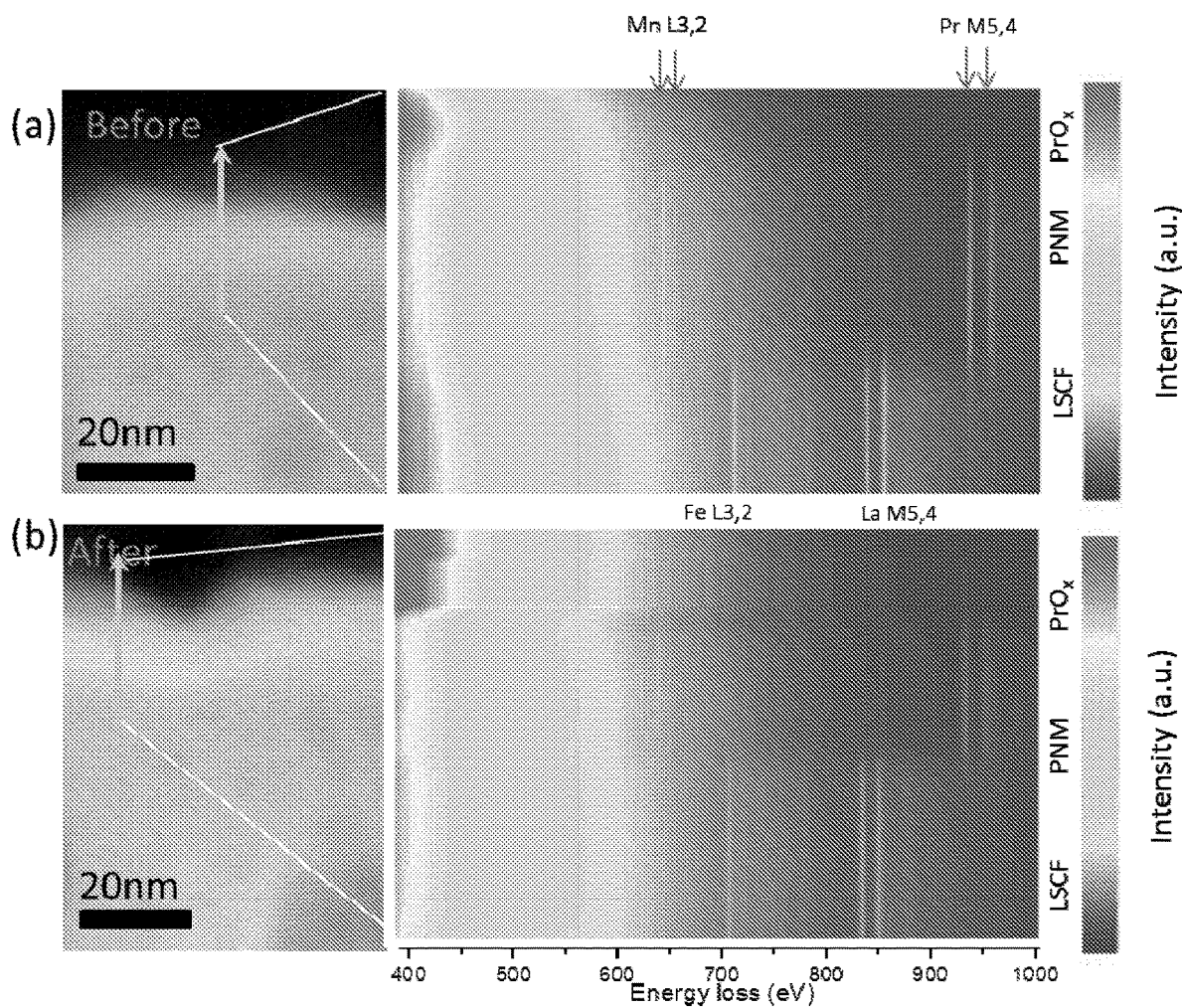

FIGS. 11(a) and 11(b) are EELS spectra of the present hybrid catalyst coated LSCF along the line before FIG. 11(a) and after FIG. 11(b) stability test at 750° C. for ~500 hours.

Figure 12:
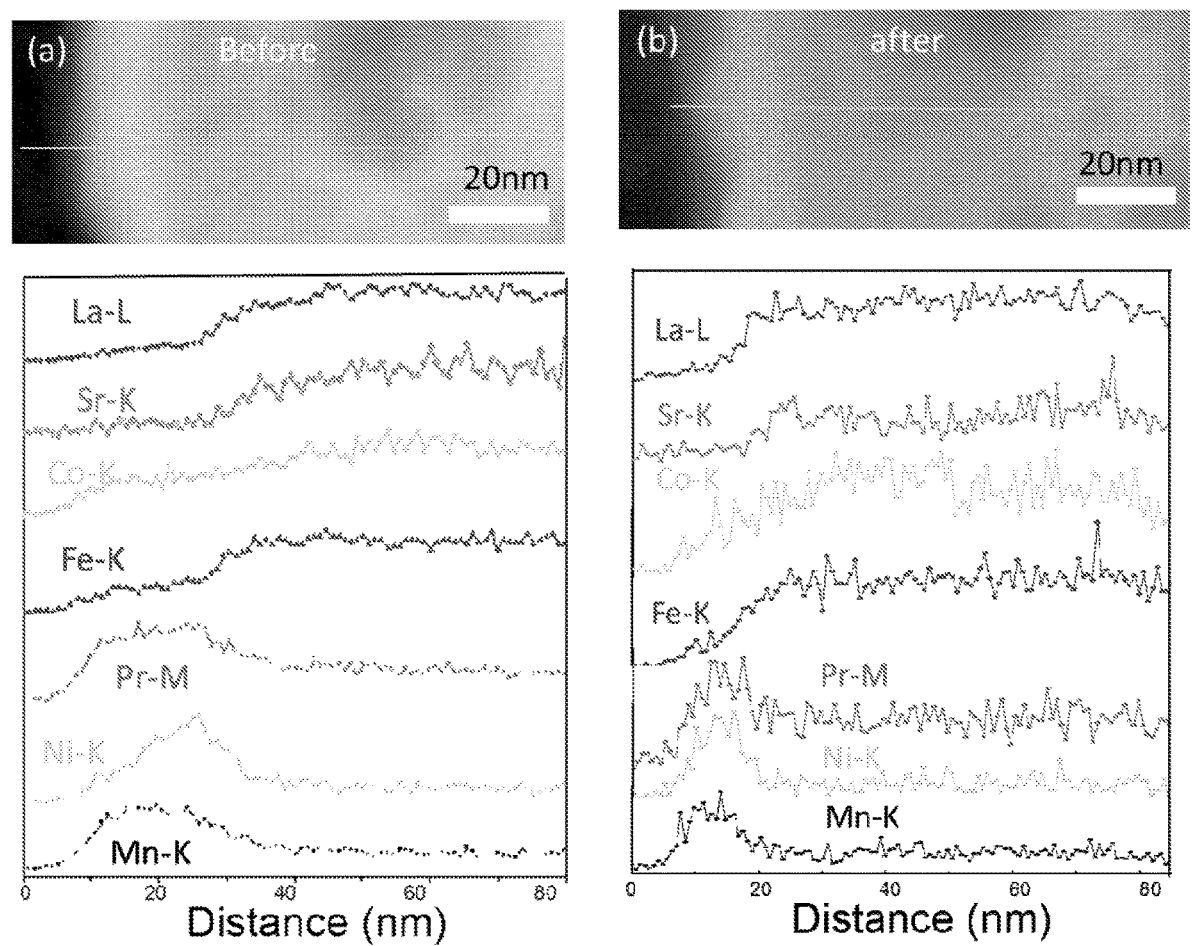

FIGS. 12(a) and 12(b) are energy-dispersive x-ray spectroscopy (EDS) profiles along the line of the cross-section of the present hybrid catalyst coated-LSCF before FIG. 12(a) and after FIG. 12(b) the stability test at 750° C. for ~550 hours. The signal became slightly noisier after the stability test, suggesting that there may be some inter-diffusion between the catalyst layer and the LSCF substrate. However, the essential composition of each layer still remained largely unchanged, implying reasonable stability during the test.

Figure 13:
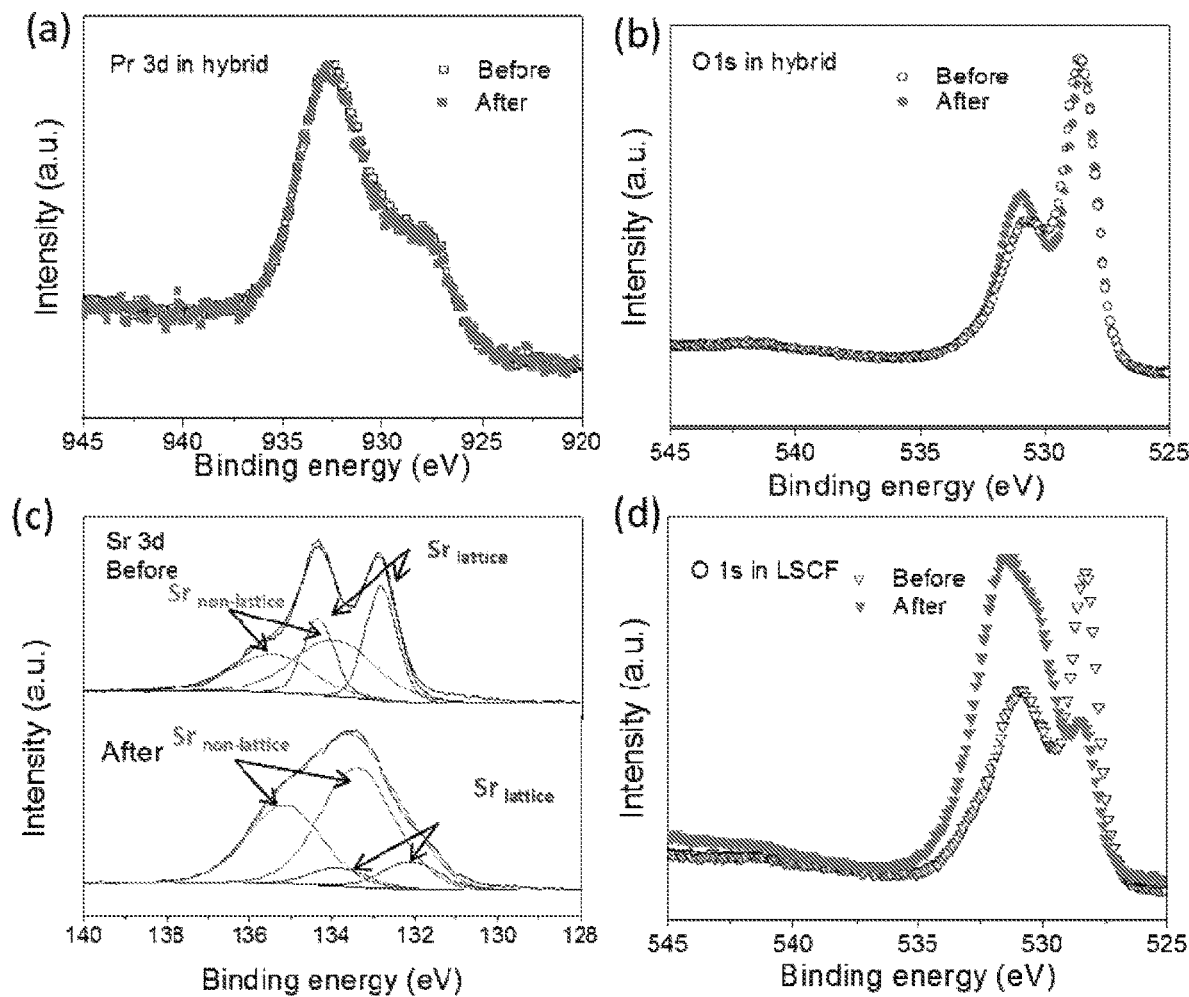

FIGS. 13(a)-13(d) are XPS spectra of FIG. 13(a) Pr 3d and FIG. 13(b) O 1s of the present hybrid catalysts coated-LSCF; FIG. 13(c) Sr 3d and FIG. 13(d) O 1s of the bare LSCF before and after the stability test at 750° C. for 500 hours. It is shown that surface of the present hybrid catalyst coated-LSCF has much better stability than that of the bare LSCF.

Figure 14:
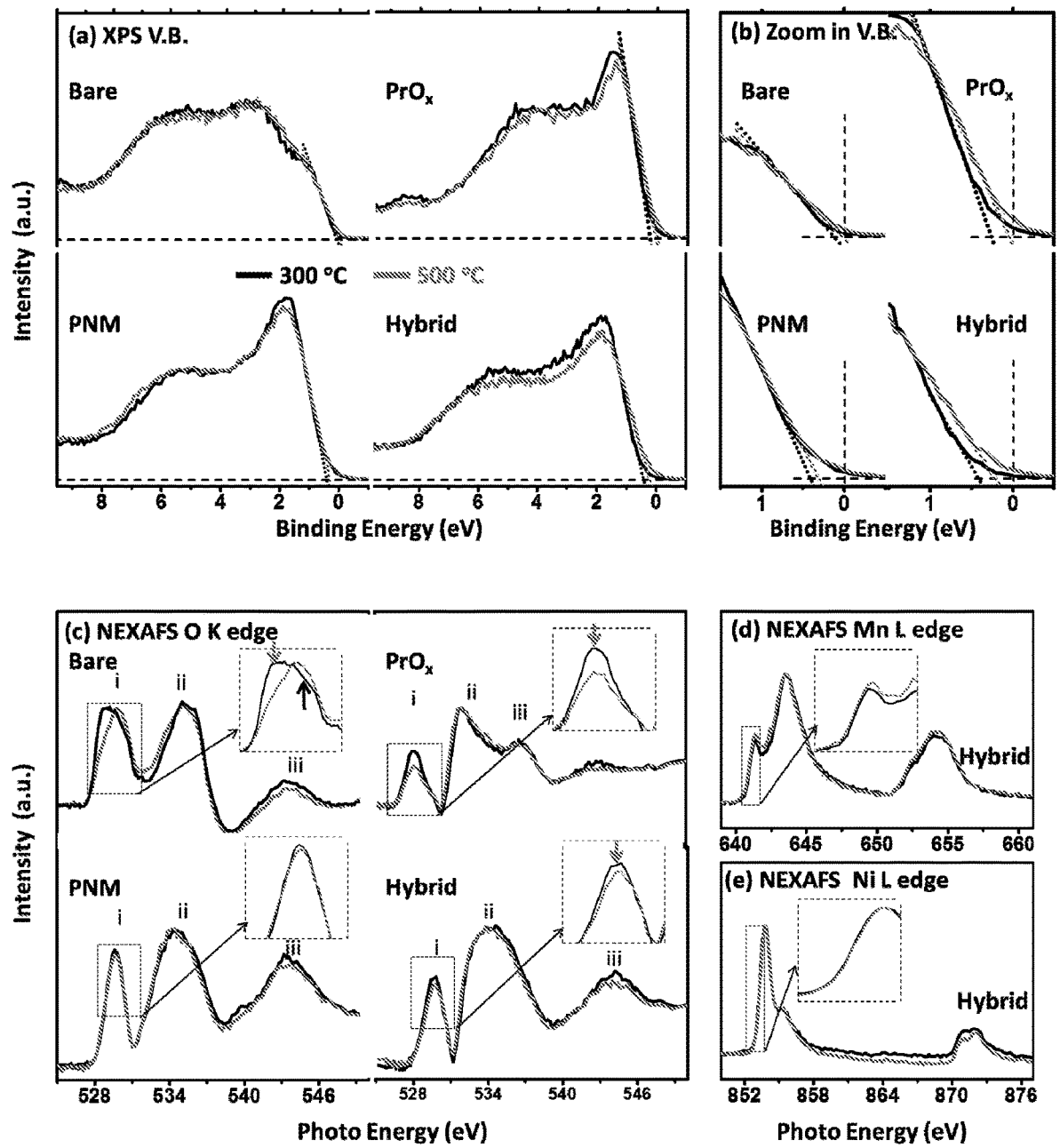

FIGS. 14(a)-(d) illustrate surface electronic structure of bare LSCF, PNM-, $PrO_x$—, and the present hybrid catalyst (PNM-$PrO_x$)-coated-LSCF model thin films characterized using near ambient XPS and NEXAFS at 300° C. and 500° C. in 200 mtorr $O_2$ environment. FIG. 14(a) presents XPS valence band structure of different films. The areas of all the valence spectra were normalized to unity. FIG. 14(b) illustrates a zoomed in valence band spectra near the Fermi level region. The dotted lines are the linear fittings of the valence band edge, and the dash lines mark the zero intensity and binding energy position. FIG. 14(c) shows the O K-edge absorption spectra of bare LSCF, PNM-, $PrO_x$—, and the present hybrid catalyst-coated LSCF. Three feature in LSCF O k-edge spectra are attributed to unoccupied state of hybrid transition metal TM (Co Fe) d —O 2p band) (feature i); La 5d, Sr 4d/O 2p states (feature ii) and Co and Fe sp-O 2p hybridized band (feature iii). The insets in FIG. 14(c) are zoom ins of the pre-edge region. FIG. 14(d) shows the Mn L-edge and FIG. 14(e) shows the Ni L-edge absorption spectra of the present hybrid catalyst (PNM-$PrO_x$).

FIG. 15(a) is the XPS spectra of Pr 4d of $PrO_x$—, PNM- and the present hybrid catalyst coated LSCF; FIG. 15(b) is the Co L-edge and FIG. 15(c) the Fe L-edge absorption spectra of LSCF. The curves are data collected at 300° C. and 500° C., respectively, in 200 mtorr oxygen. The inset figure in FIG. 15(b) and FIG. 15(c) are the zoom in figure of the pre-edge region.

Figure 16:
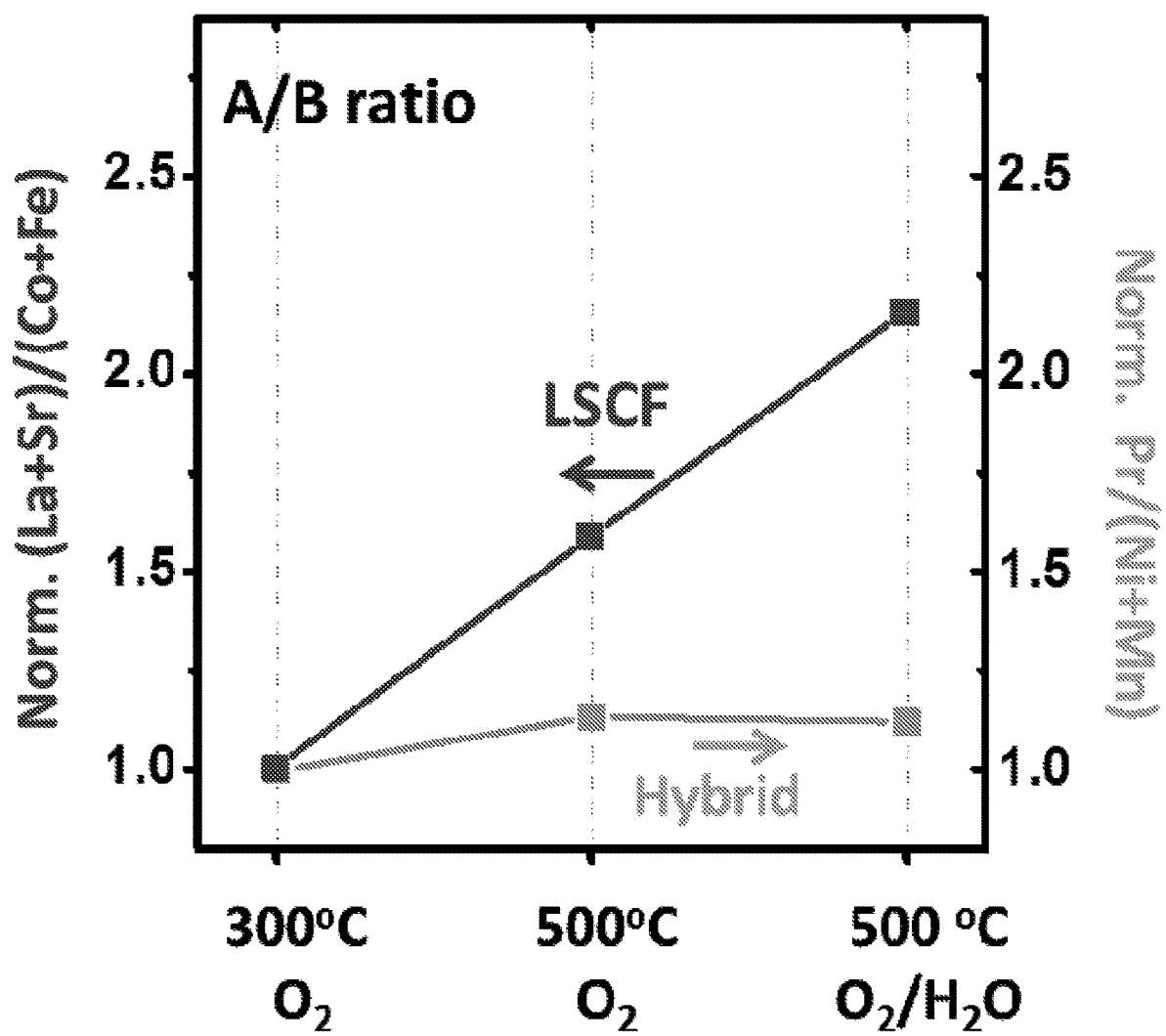

FIG. 16 is a graph of the surface composition of LSCF and the present hybrid catalyst (PNM-$PrO_x$) measured under different conditions: 200 mtorr of $O_2$ at 300° C., 200 mtorr of $O_2$ at 300° C., and 200 mtorr of a gas mixture (90% $O_2$+10% $H_2O$) at 500° C. For comparison, the (La+Sr)/(Co+Fe) and Pr/(Ni+Mn) were normalized by the values obtained in 200 mtorr of $O_2$ at 300° C.

Figure 17:
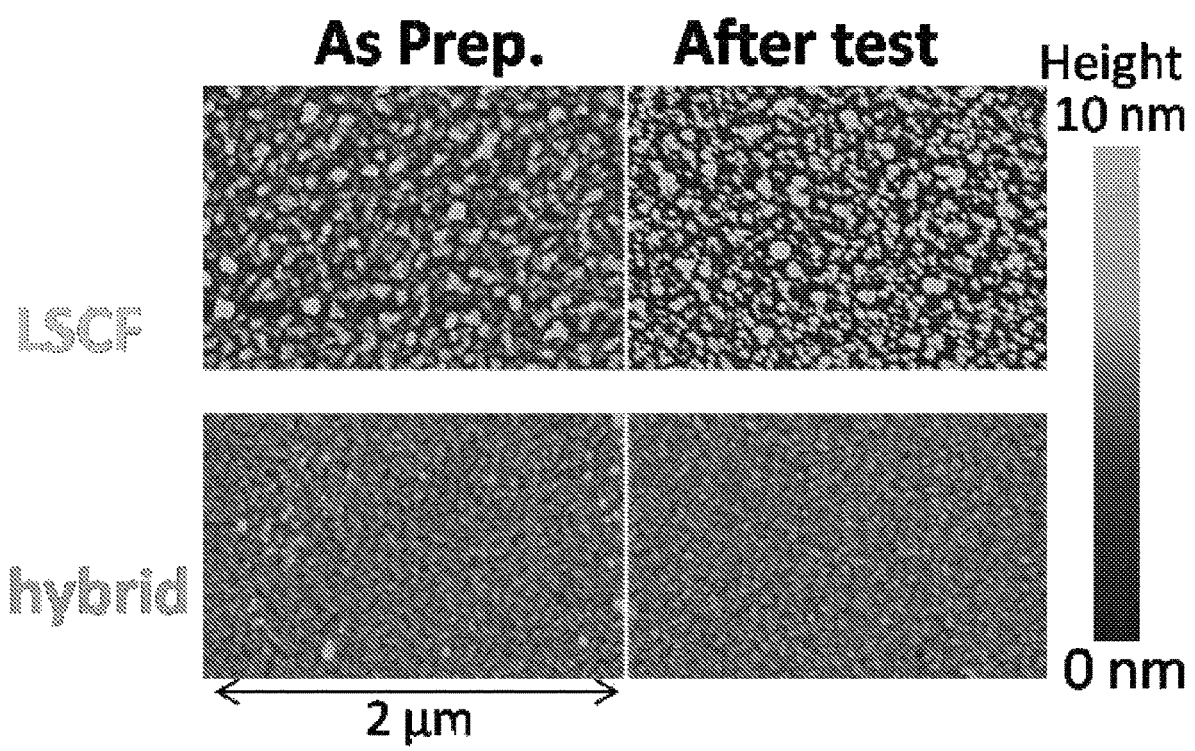

FIG. 17 is an AFM image of LSCF and the present hybrid catalyst (PNM-$PrO_x$) thin films (before and after test) shown in FIG. 16.

Figure 18:
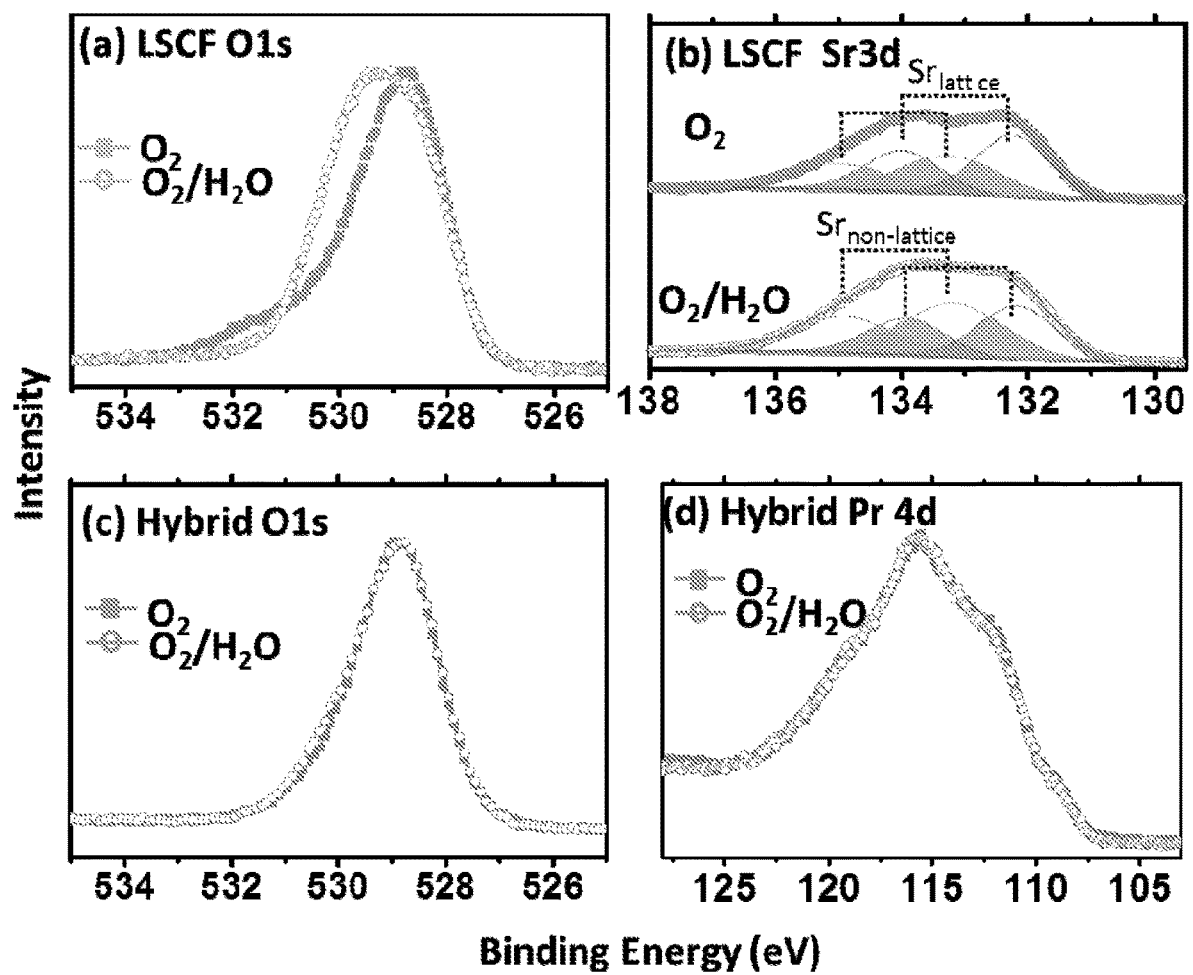
Figure 19:
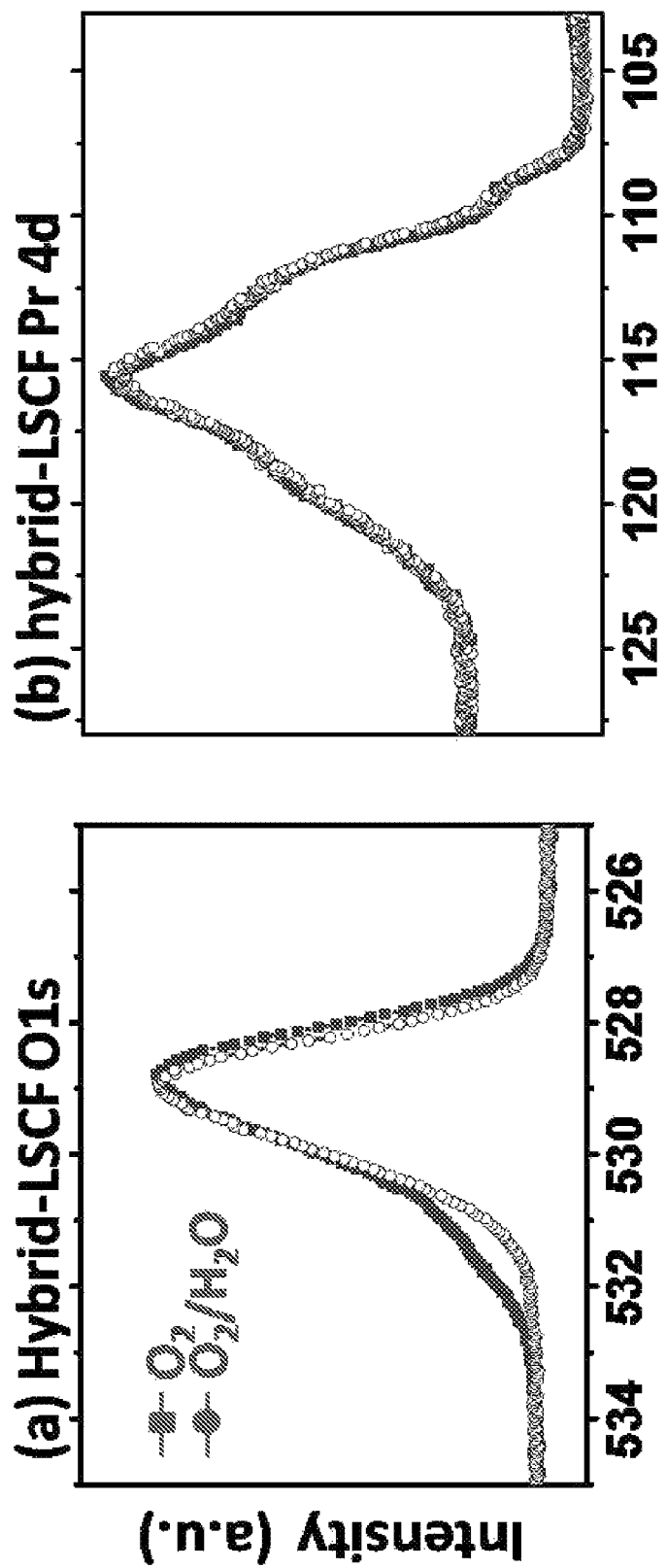

FIG. 18(a) is O 1s and FIG. 18(b) is Sr 3d spectra of the LSCF at 500° C. in 200 mtorr $O_2$ and with 10% $H_2O$. FIG. 18(c) is O 1s and FIG. 18(d) is Pr 4d spectra of the present hybrid PNM-$PrO_x$ catalyst at 500° C. in 200 mtorr $O_2$ and with 10% $H_2O$. The main peak located near 528.8 eV is attributed to lattice O in LSCF. The small peak near 532 eV was due to the adsorbates at the surface that have not been completely removed by heating at 300° C. After exposing the sample to 10% $H_2O$+90% $O_2$, a clear increase in intensity was observed near 530 eV, which is attributed to —OH. Simultaneously, the component corresponding to Sr—OH ($Sr_{non-lattice}$) in Sr 3d spectra clearly increases after exposing the sample to 10% $H_2O$+90% $O_2$ (FIG. 18(b)), which is in accord with the change in the O 1s spectra (FIG. 18(a)). On the other hand, there appears little change in the O 1s and Pr 4d peak on the catalyst (pure) surface before and after exposure to 10% $H_2O$ (FIG. 18(c) and FIG. 18(d)). As shown in FIG. 19, the O 1s and Pr 4d spectra for the present hybrid catalyst coated LSCF also do not change, indicating similarly stable surface for the present hybrid catalyst coated LSCF samples.

FIG. 19(a) is O 1s and FIG. 19(b) is Pr 4d spectra of the present hybrid catalyst coated LSCF at 500° C. in 200 mtorr $O_2$ and with 10% $H_2O$.

Figure 20:
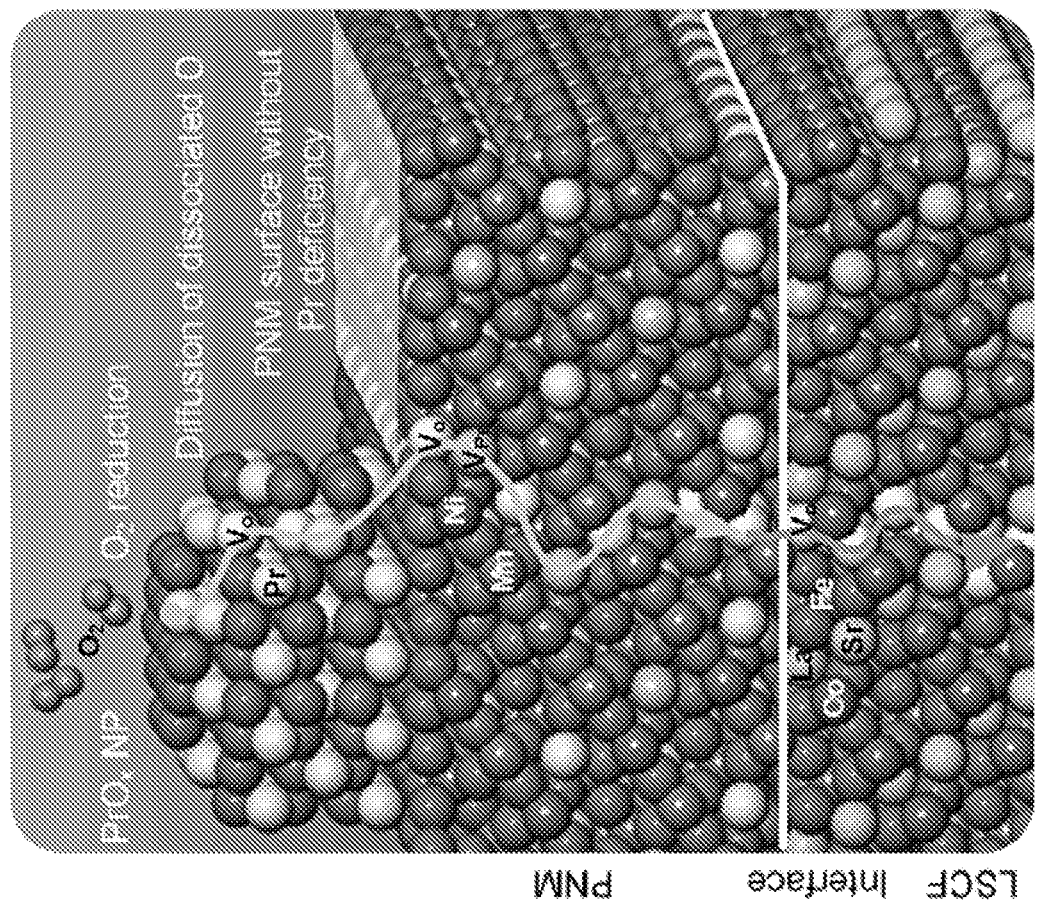
Figure 20:
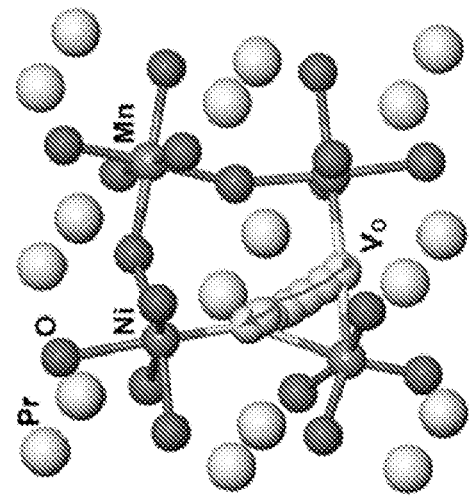
Figure 20:
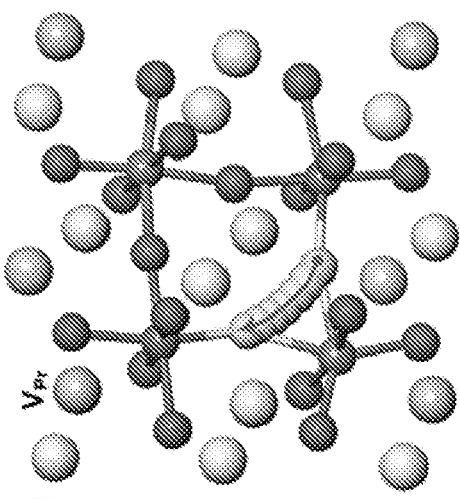

FIG. 20(a)-(c) are representations of a trajectory of oxygen vacancies FIG. 20(a) without and FIG. 20(b) with Pr deficiency ($V_{Pr}$). The solid arrow represents the oxygen migration trajectory. FIG. 20(c) is a schematic representation of the lowest energy pathway for the $O_2$ reduction on the present hybrid catalyst ($PrO_x$/PNM) coated LSCF cathode and the enhanced bulk diffusion of oxygen vacancies in PNM by introducing Pr deficiency.

Figure 21:
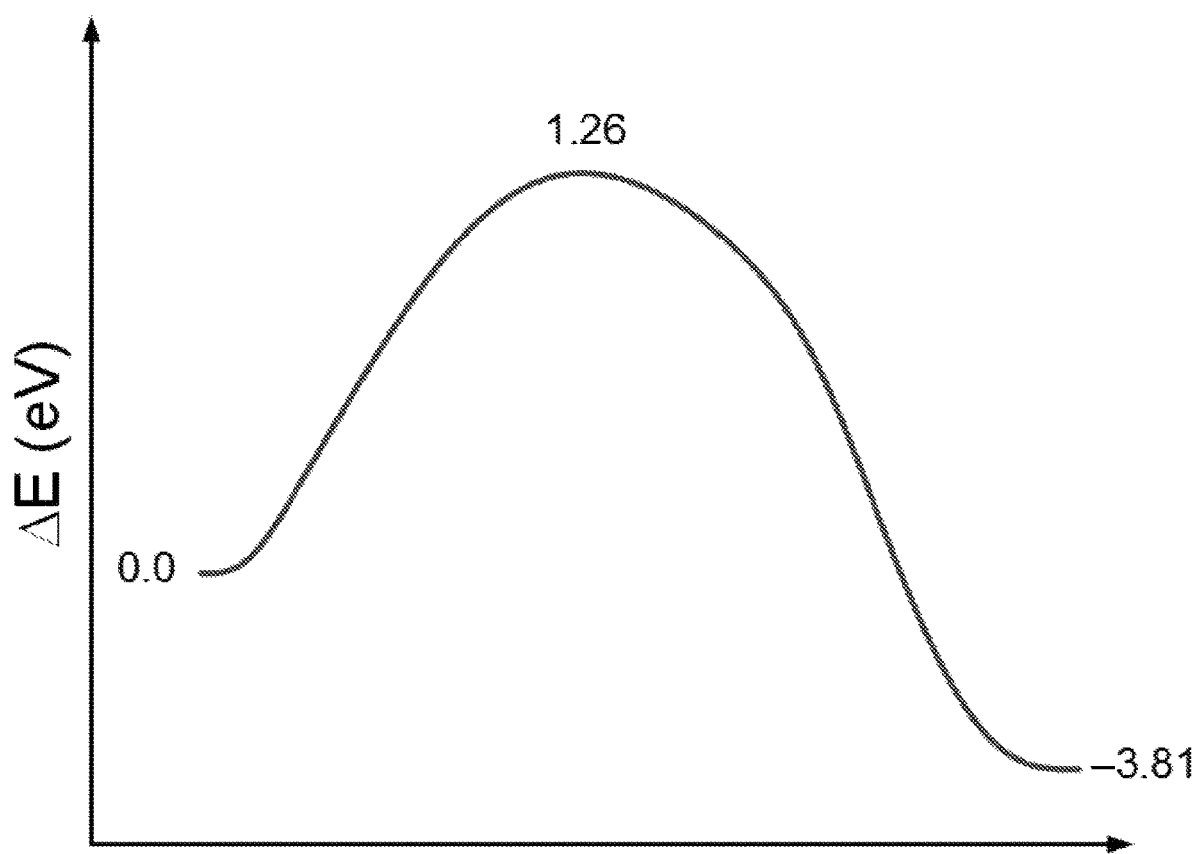

FIG. 21 is a graph of the trajectory of oxygen ion conduction through bulk PNM without Pr segregation. Note that the bulk diffusion with Pr segregation may take place without a well-defined migration barrier (0.45 eV).

FIGS. 22(a) and 22(b) illustrate the trajectories of oxygen ion conduction through the $PrO_x$/PNM(001) surface FIG. 22(a) without and FIG. 22(b) with Pr segregation.

Figure 23:
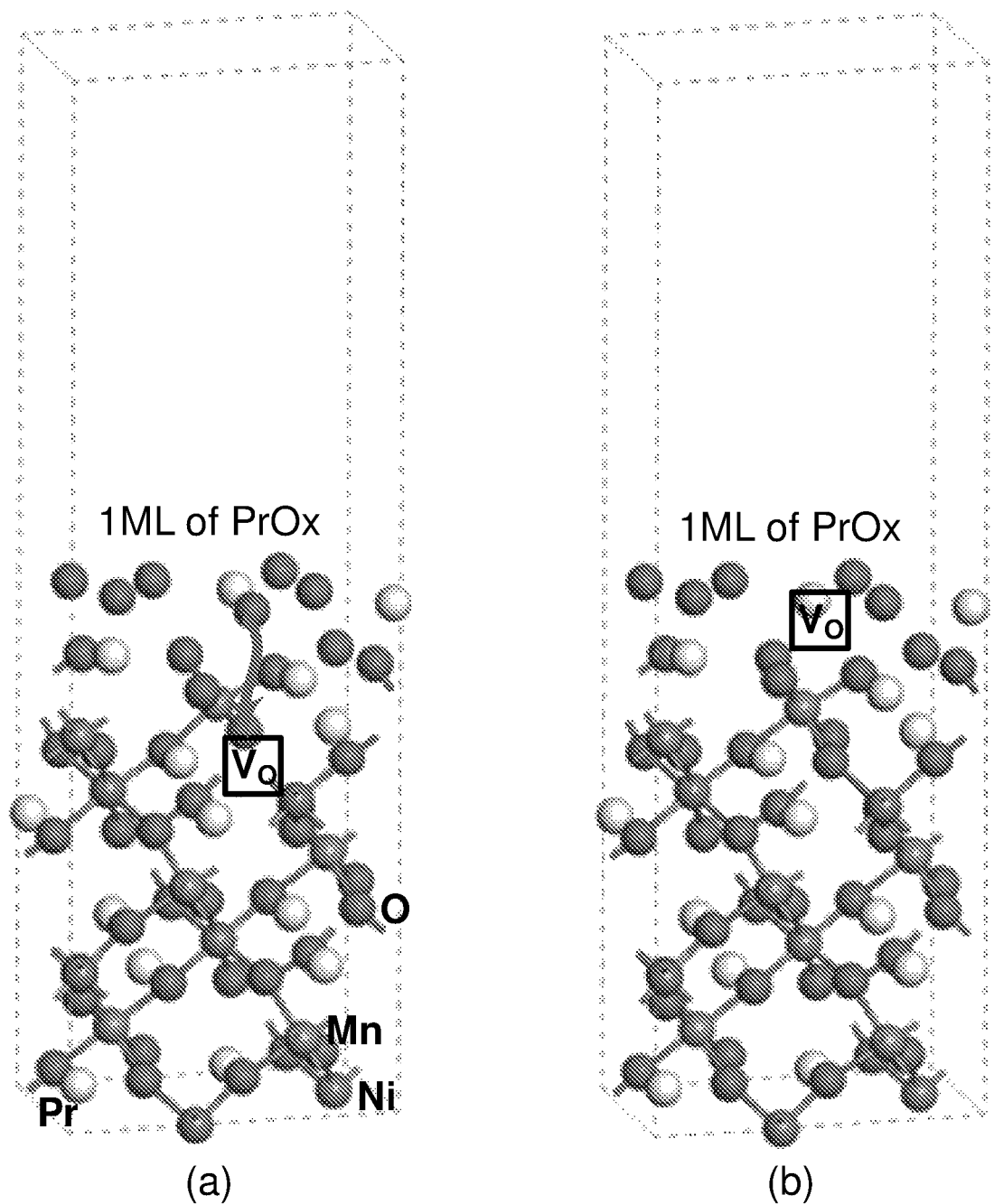

FIG. 23 is a schematic of oxygen ion diffusion from the surface of 1 ML $PrO_x$ into the PrO—Ni—PrO—Mn-terminated PNM(110) surface without Pr segregation. FIG. 23(a) shows before and FIG. 23(b) shows after diffusion. $V_O$ represents an oxygen vacancy.

Figure 24:
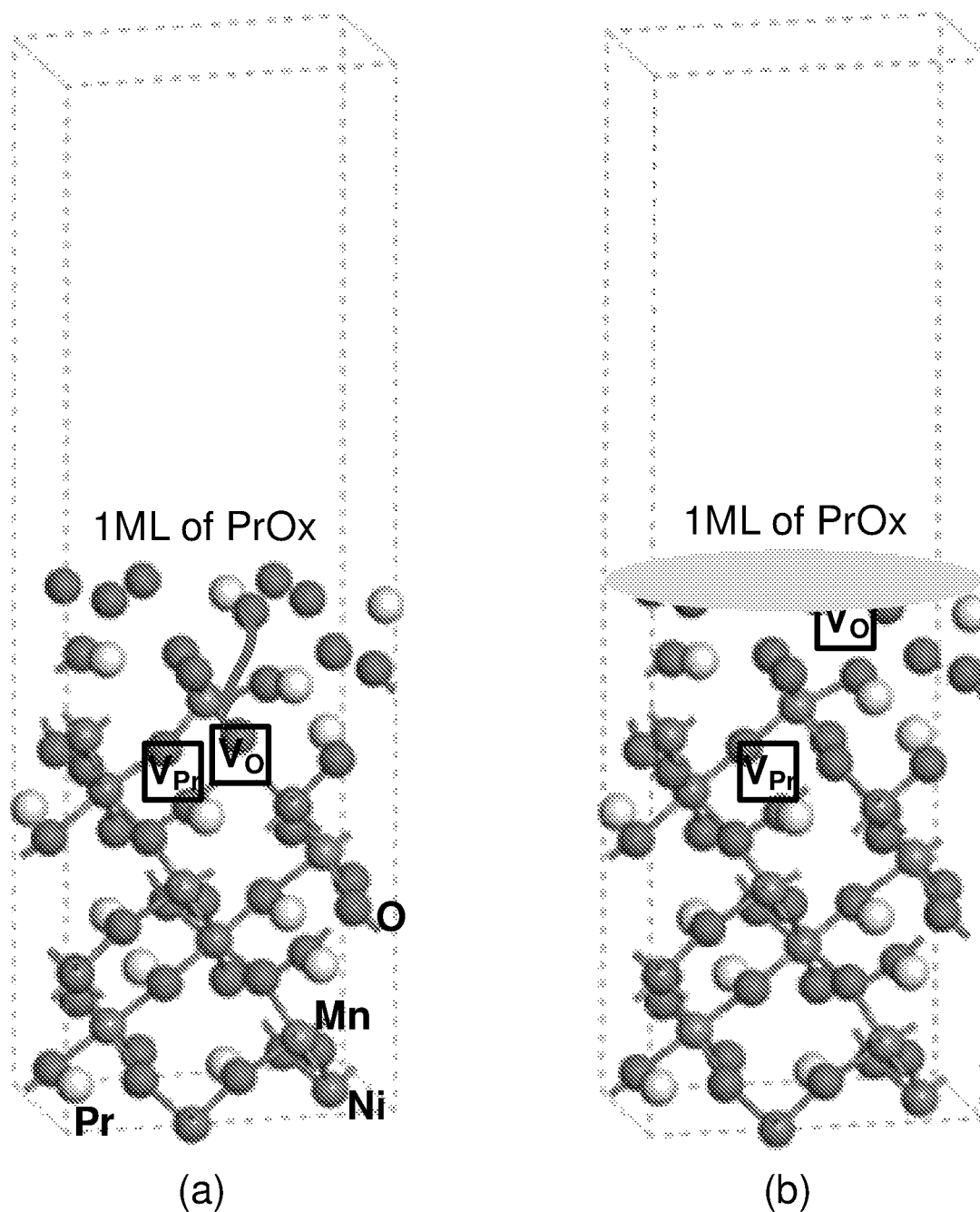

FIG. 24 is a schematic of oxygen ion diffusion from the surface of 1 ML $PrO_x$ into the PrO—Ni—PrO—Mn-terminated PNM(110) surface with Pr segregation. FIG. 24(a) shows before and FIG. 24(b) shows after diffusion. $V_O$ and $V_{Pr}$ represent an oxygen vacancy and a Pr vacancy, respectively.

DETAIL DESCRIPTION OF THE INVENTION

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

RP-type layered perovskites, for example $Pr_2NiO_{4+\delta}$ ($\delta$=0.15-0.22), have been studied as a potential cathode for SOFC because of the unique oxygen ion transport properties. When a Mn-doped $Pr_2NiO_{4+\delta}$ with an intended formula of $Pr_2Ni_{0.5}Mn_{0.5}O_{4+\delta}$ was used as a catalyst to coat the surface of a porous LSCF cathode however, it is found that the catalyst layer is, in fact, composed of a $PrO_x$ phase (with a possible composition of $Pr_7O_{12}$) and a single perovskite phase $PrNi_{0.5}Mn_{0.5}O_3$ (PNM) (FIG. 1) under conditions where the solution infiltration of catalysts are into a porous LSCF cathode. The advantages of the nano-particles derived from an exsolution process over those from other, conventional, deposition techniques (such as solution infiltration of nano-particles) include better control over particle size, distribution, and morphological stability.

Figure 2:
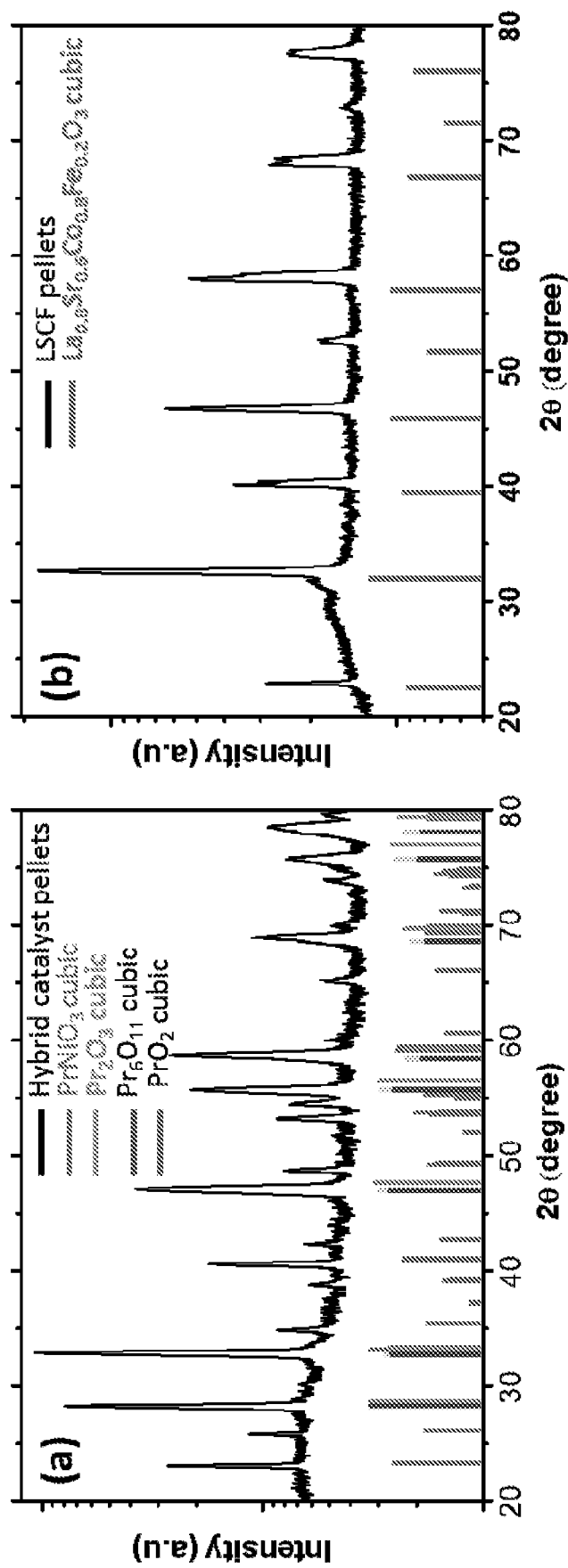
FIGS. 2(a) and 2(b) are XRD patterns (2Θ–ω scan) of the pulsed laser deposition (PLD) target for FIG. 2(a) the present hybrid catalyst and FIG. 2(b) bare LSCF. The present hybrid catalyst and the LSCF target have the same phase composition as that of the porous hybrid catalyst coated-LSCF cathodes.
Figure 3:
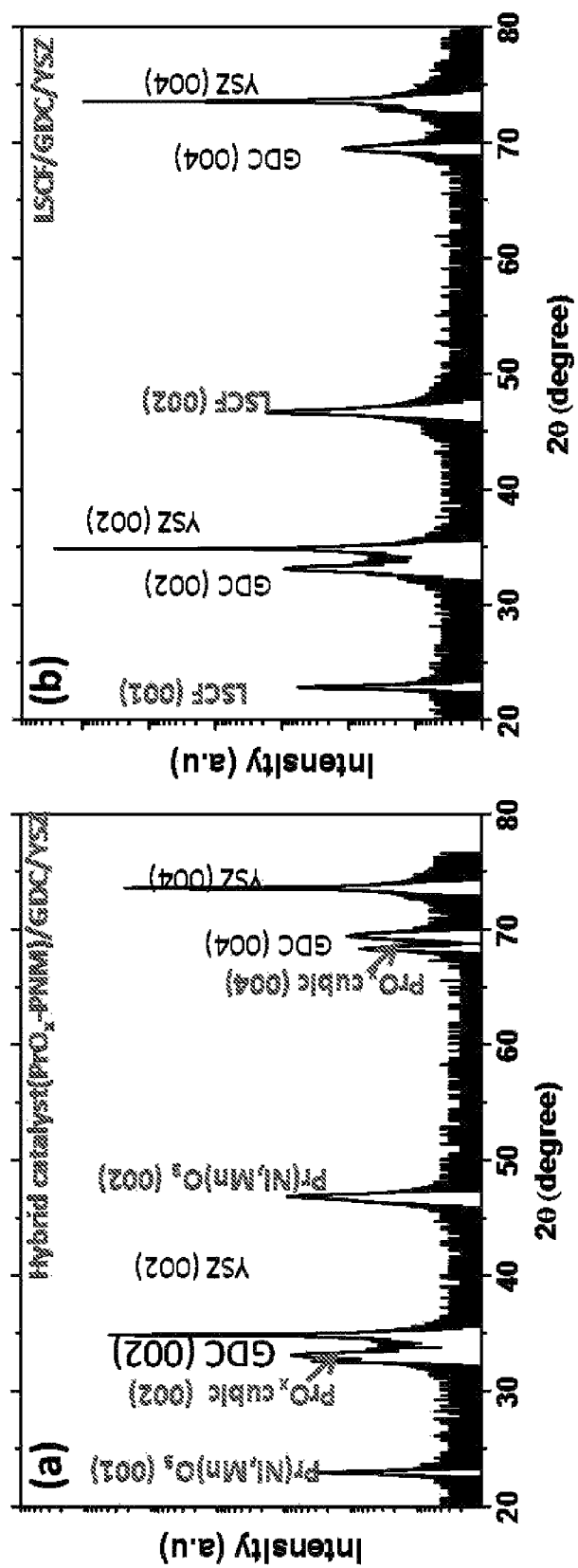
FIGS. 3(a) and 3(b) are XRD patterns (2Θ–ω scan) of FIG. 3(a) the present hybrid catalyst film on yttria-stabilized zirconia (YSZ) with Gadolinium doped ceria (GDC) as a buffer layer, FIG. 3(b) LSCF on YSZ with GDC as a buffer layer grown by PLD. The present hybrid catalyst thin films are the mixture of fluorite $PrO_x$ and perovskite PNM phase, which are the same as the porous cathodes. The targets were characterized using Panalytical Multipurpose Diffractometer. The PLD thin films were measured by HR-XRD using a Rigaku Smartlab diffractometer equipped with 2-bounce Ge (220) channel-cut monochromator and Cu Kα1 radiation. The surface morphology was characterized by atomic force microscopy (AFM) using Veeco/Digital Instrument Nanoscope IV. The AFM images were processed using the Nanoscope software version 5.31R1 (Digital Instruments).

To probe the surface chemistry and electronic structure of the present hybrid catalyst in order to explain the mechanism of performance enhancement, a thin-film of the catalyst was deposited on a model cell with a flat, dense LSCF electrode using PLD. (FIGS. 2-3).

The similarity in crystal structure of PNM to that of LSCF facilitates facile epitaxial growth of a dense and conformal coating of PNM on each LSCF grain (FIG. 4), allowing the evaluation of its effect on suppressing Sr segregation and, thus, on enhancing stability and durability of the LSCF cathode.

The Architecture of the Catalyst-Coated Electrode

Figure 4:
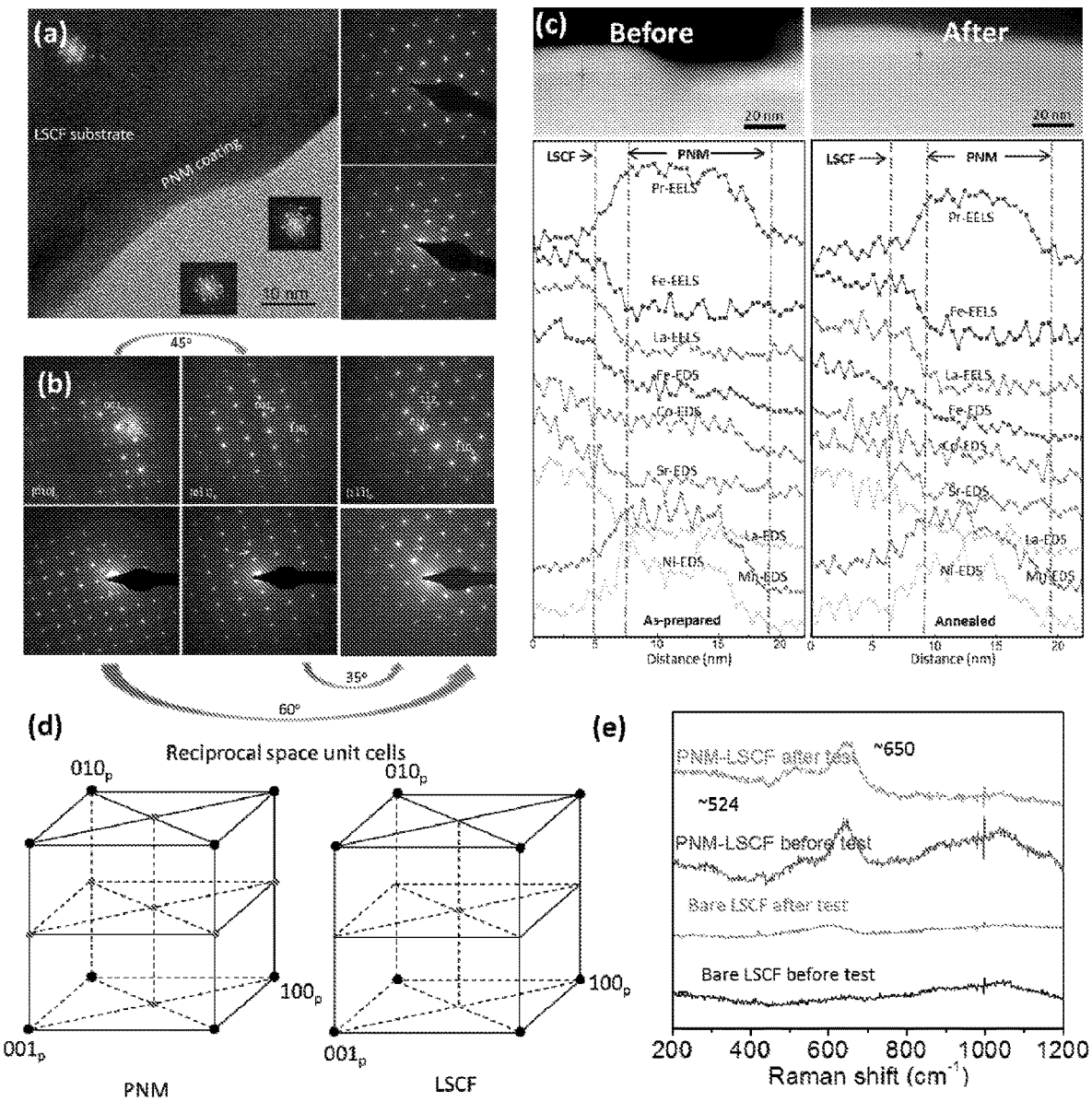
FIG. 4(a) is a high-resolution transmission electron microscopy (TEM) image of a PNM-coated LSCF pellet fired at 800° C. for two hours.
FIG. 4(b) includes selected-area electron diffraction (SAED) patterns from $[010]_p$, $[0\bar{1}1]_p$ and $[1\bar{1}\bar{1}]_p$ electron-beam directions. The top three SAED patterns are solely from a LSCF grain, while the bottom three are from the epitaxial thin film area containing both LSCF and PNM grains. The subscript "p" means the primary perovskite unit cell.
FIG. 4(c) are high angle annular dark field (HAADF) scanning transmission electron microscopy (STEM) images and elemental profiles along the lines for PNM-LSCF before and after annealing at 800° C. for two hours.
FIG. 4(d) includes the unit cells of PNM and LSCF in reciprocal space.
FIG. 4(e) is a typical Raman spectra of bare LSCF and PNM-coated LSCF cathodes (before and after test at 750° C. for 500 hours) collected in air at room temperature.
Figure 5:
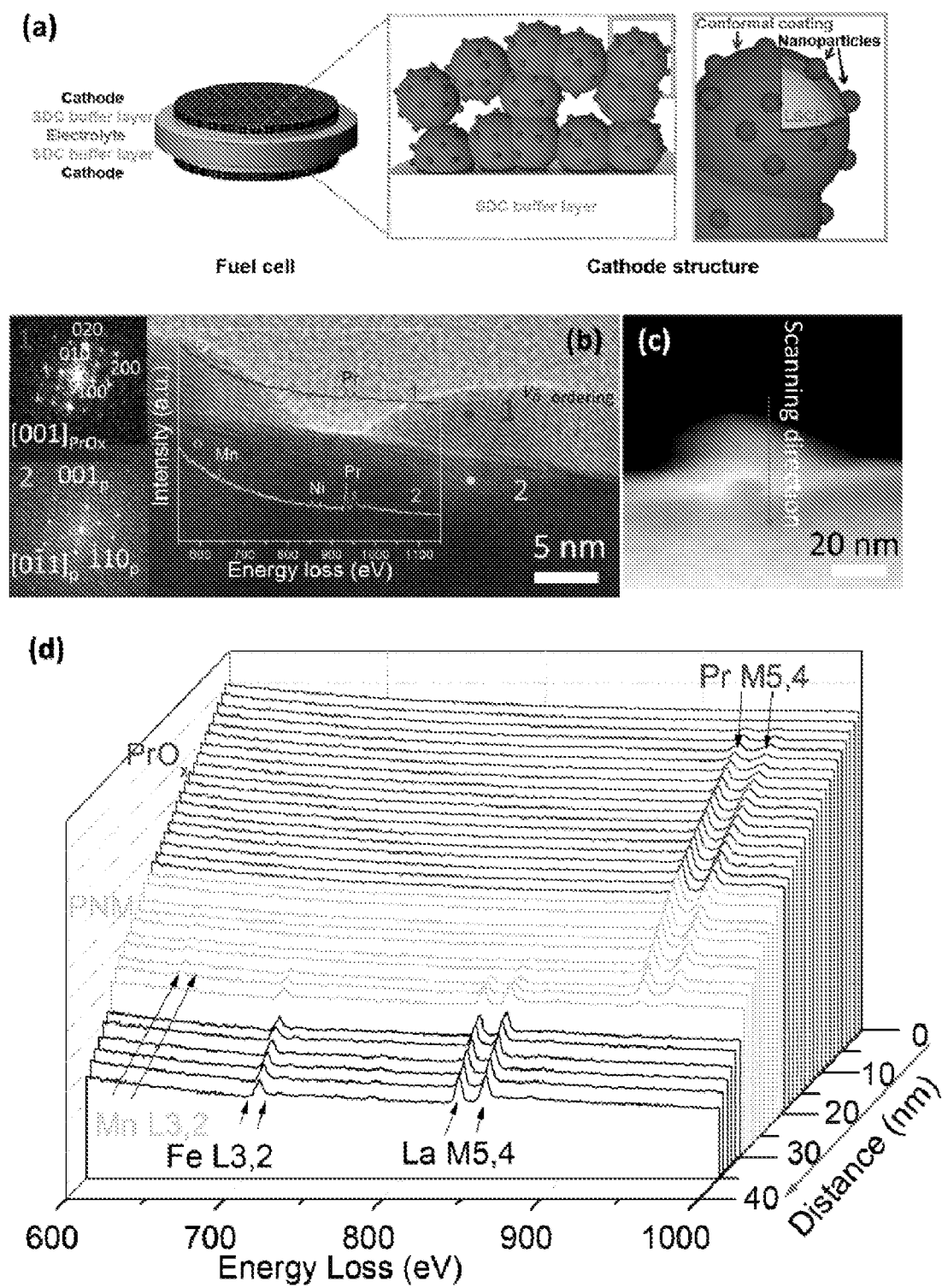
FIG. 5(a) is a schematic of an LSCF electrode backbone decorated with a conformal, dense PNM coating and exsoluted $PrO_x$ nano-particles.
FIG. 5(b) is a high-resolution TEM image showing two $PrO_x$ particles on a conformal PNM coating deposited on an LSCF grain. The insets are the fast Fourier transform (FFT) patterns from the nano-particles (location 1) and the conformal PNM coatings (location 2); and the electron energy loss spectroscopy (EELS) spectra from location 1 and 2, suggesting that the nano-particles are mainly $PrO_x$ (location 1), while the conformal coating is PNM (location 2).
FIG. 5(c) is a HAADF-STEM image of a cross-section of the present hybrid catalyst-coated LSCF cathode.
FIG. 5(d) is an EELS spectra acquired along the arrow marked in FIG. 5(c), indicating that the exsoluted particles are $PrO_x$, whereas the thin, conformal coating is PNM on the top of the LSCF grain.

FIG. 5(a) schematically shows the surface morphology of the present hybrid catalyst coating on a porous LSCF electrode backbone (sintered large LSCF grains); the conformal coating comprising a PNM film decorated with $PrO_x$ nano-particles. FIG. 5(b) shows a TEM image of two $PrO_x$ particles on the PNM coating. The two insets in FIG. 5(b) are the FFT patterns of the $PrO_x$ nano-particles (fluorite structure) and the PNM coating (perovskite structure), respectively (FIGS. 4(a) and 4(b)). The FFT pattern of the nano-particle (inset of FIG. 5(b)), together with EELS spectra shown in FIG. 5(b) acquired from the two locations (1 and 2 in FIG. 5(b)) further indicated that those nano-particles are mainly $PrO_x$.

The superlattice spots in the FFT pattern (location 1 in FIG. 5(b)) are induced most likely by the formation of oxygen vacancies ordering within $PrO_x$. Shown in FIG. 5(c) is a cross-sectional view (a HAADF-STEM image) of the present hybrid catalyst coated LSCF. The EELS spectra (FIG. 5(d)) acquired along the line marked on FIG. 5(c) clearly indicated that the exsoluted particles are $PrO_x$ while the thin PNM layer (~10 nm thick) was conformally coated on the LSCF surface.

Electrochemical Performance

Figure 6:
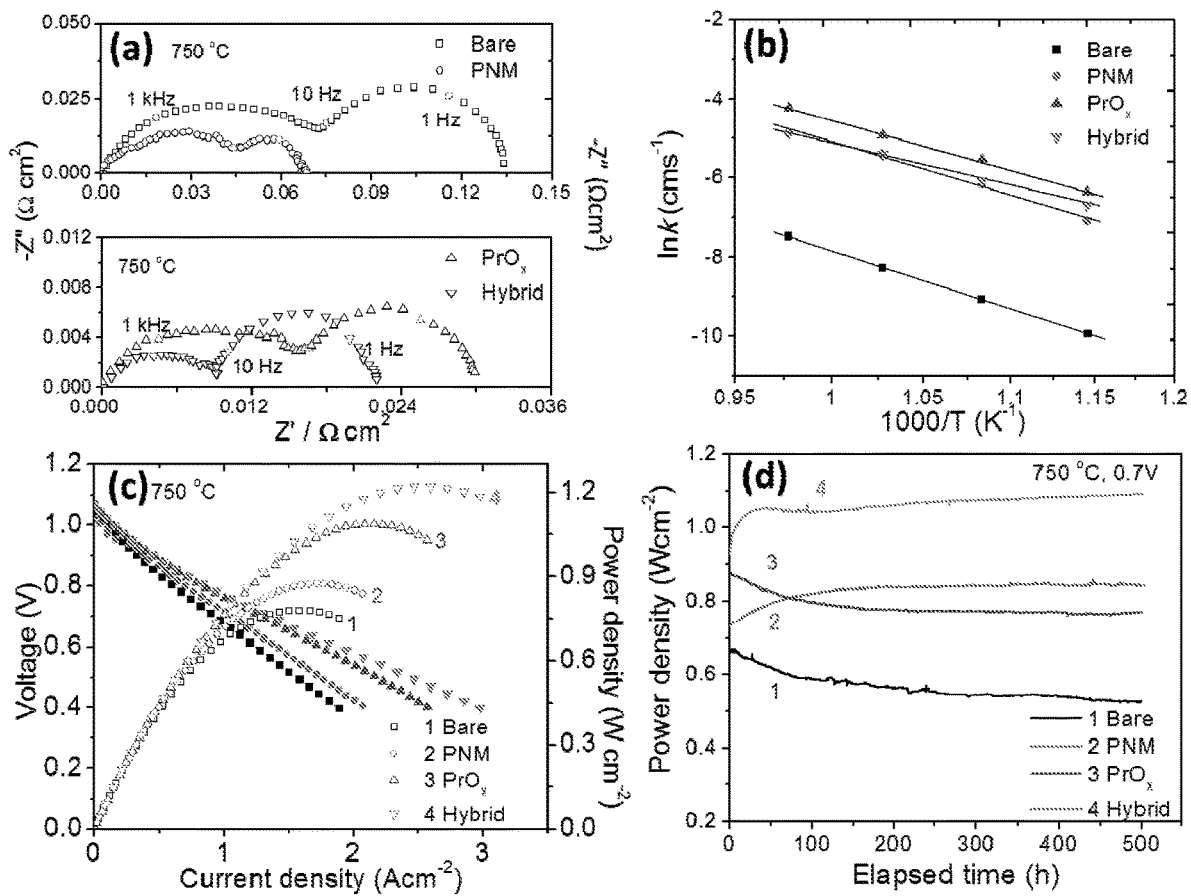
FIG. 6(a) is a typical electrochemical impedance spectra (EIS) of cells with a bare LSCF, PNM-, $PrO_x$— and the present hybrid catalyst-coated LSCF electrode, measured in ambient air at 750° C. under the open-circuit voltage (OCV) condition.
FIG. 6(b) illustrates temperature dependence of surface exchange coefficient (k) of the bare LSCF and catalyst-coated LSCF cathodes.
FIG. 6(c) shows typical I-V-P curves.
FIG. 6(d) shows stability testing (at a constant cell voltage of 0.7V) for Ni-YSZ anode supported cells with bare LSCF or PNM-, $PrO_x$— or the present hybrid PNM-$PrO_x$ catalyst-coated LSCF cathode at 750° C. using 3% humidified $H_2$ as fuel and ambient air as oxidant.
Figure 7:
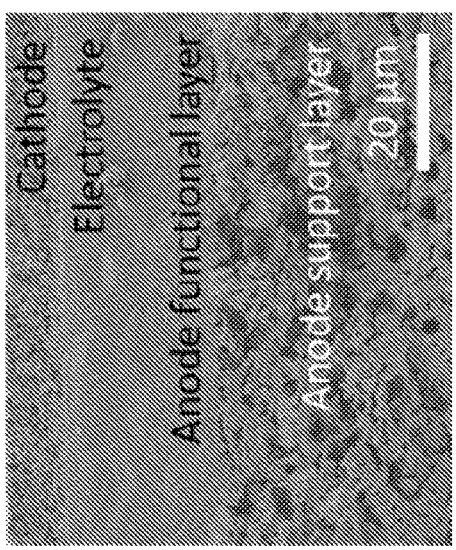
FIG. 7(a) is a schematic of symmetrical cells with two identical LSCF cathode backbones bonding to both sides of electrolyte with help of a Sm-doped ceria (SDC) buffer layer.
FIG. 7(b) is a schematic of a detailed LSCF coated with conformal catalyst coatings and nano-particles.
FIG. 7(c) is an SEM image of as-prepared single cell, with configuration of NiO-YSZ anode support, NiO-YSZ functional layer (~15 μm), YSZ electrolyte (~15 μm), SDC buffer layer (2-4 μm) and the present hybrid catalyst coated LSCF cathode (50 μm). The thickness of the present inventive catalyst coating is very thin (from a few nm to about 20 nm), far thinner than other cell components such as the cathode (~50 μm), the electrolyte (~15 μm), and the anode support (~800 μm). Accordingly, the amount of catalyst required is very small, implying that the Pr-based catalyst could be economically competitive for commercial applications.
Figure 7:
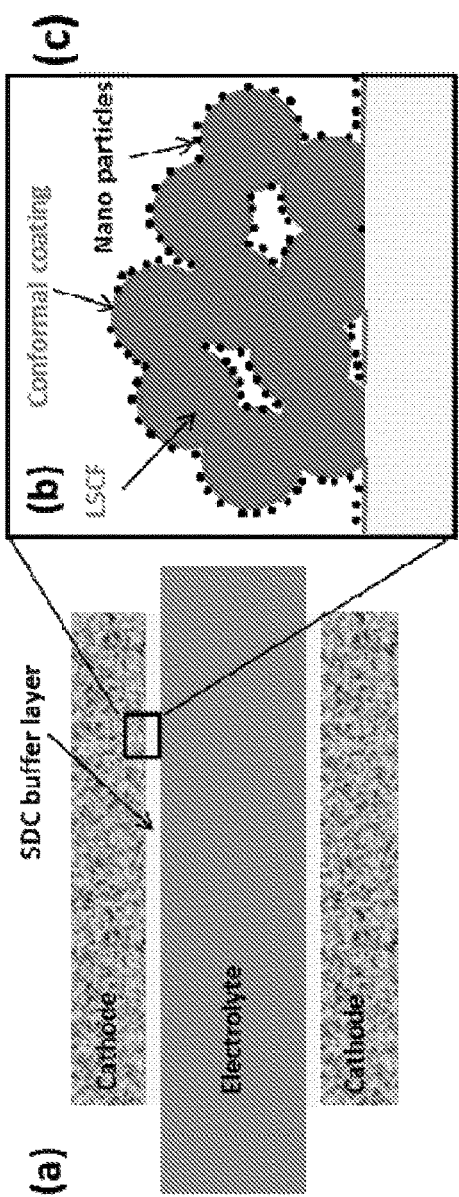

Shown in FIG. 6(a) are some typical EIS, acquired in ambient air at 750° C. under OCV condition, of the symmetrical cells with a bare LSCF, PNM-coated LSCF, $PrO_x$-coated LSCF, and the present hybrid catalyst (PNM and $PrO_x$)-coated LSCF electrodes (FIGS. 7(a) and 7(b)). The $R_p$ at 750° C. of these electrodes are 0.134, 0.068, 0.030, and 0.022 $\Omega cm^2$ for bare LSCF, PNM-coated LSCF, $PrO_x$-coated LSCF, and the present hybrid-catalyst-coated LSCF, respectively.

Figure 8:
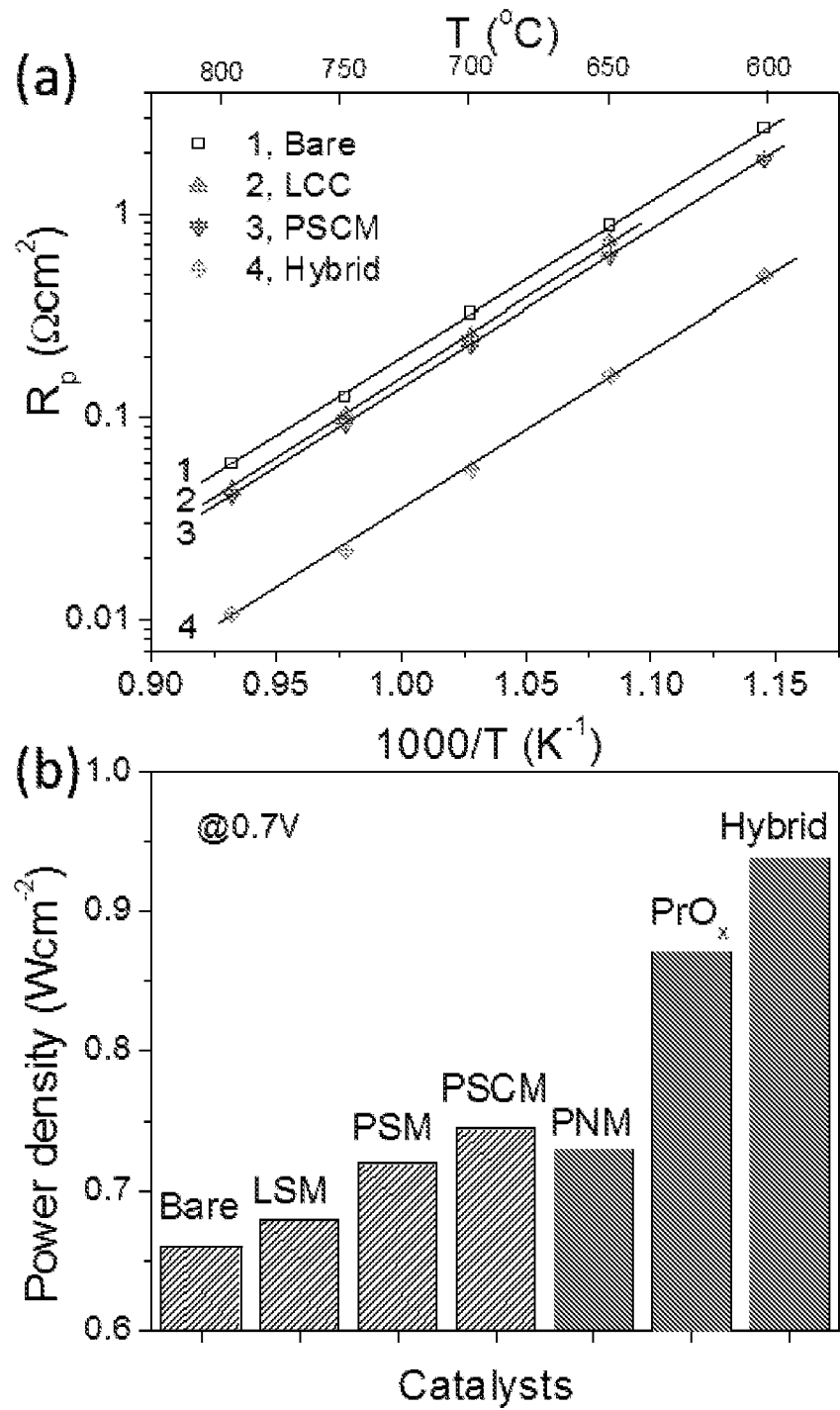
FIG. 8(a) is a graph of temperature dependence of interfacial polarization resistance ($R_p$) of different catalyst-coated LSCF cathodes under OCV conditions in ambient air: 1—Bare, 2—$La_{0.4875}Ca_{0.0125}Ce_{0.5}O_{2-\delta}$ (LCC) coated, 3—$PrSrCoMnO_{6-\delta}$ (PSCM) coated, and 4—the present hybrid coated.
FIG. 8(b) is a graph of initial power density of cells with different catalysts coated LSCF cathode at 0.7V, using 3% water humidified $H_2$ as fuel and ambient air as oxidant: Bare, LSM, PSM, PSCM, and PNM, $PrO_x$-LSCF and the present hybrid.

Clearly, the LSCF coated with a thin film of the present hybrid catalyst (PNM and $PrO_x$) displayed the lowest $R_p$ among all cathodes studied, much better than the other two excellent cathodes reported earlier: LCC coated-LSCF and PSCM coated-LSCF (FIG. 8).

Figure 9:
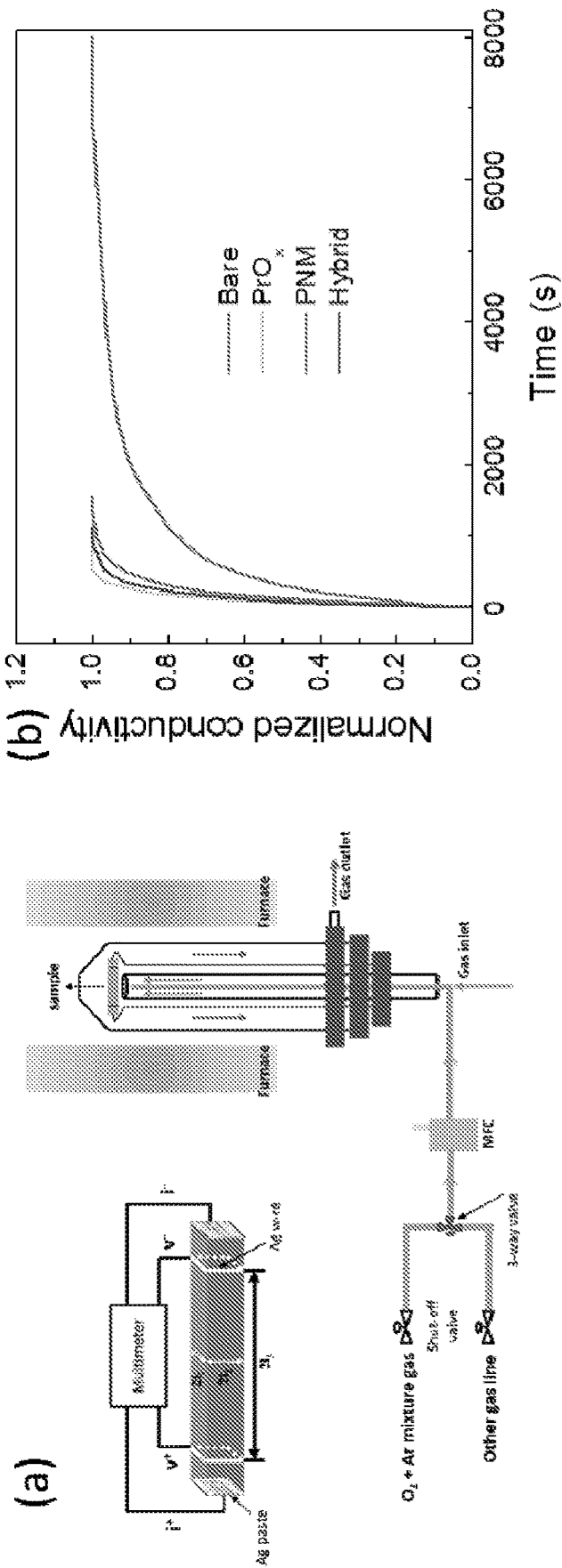
FIG. 9(a) is a schematic of an experimental arrangement for measuring electrical conductivity relaxation (ECR) curves.
FIG. 9(b) is a graph of normalized conductivity at 700° C. as a function of time for the bare LSCF and the catalysts coated on the LSCF ($PrO_x$, PNM and the present hybrid), respectively. The relaxation time to reach equilibrium was about 7500 seconds for the bare LSCF bar pellet. Time was reduced to 1000-2000 seconds when the catalysts were coated on the LSCF bar pellet. The reduced relaxation time is attributed to enhancement in the surface exchange properties.

The results suggest that the present hybrid catalyst (PNM and $PrO_x$) has the highest ORR activity on LSCF. Further, the surface exchange kinetics of these cathodes was also determined from ECR measurements (FIG. 6(b) and FIG. 9). At 750° C., the surface exchange coefficient (k) for the bare LSCF was ~5.68×10$^{-4}$ cm/s, which is consistent with previous values reported for LSCF. The k for $PrO_x$—, PNM- and the present hybrid catalyst coated LSCF electrodes increased to ~1.77×10$^{-2}$, 7.58×10$^{-3}$, and 7.50×10$^{-3}$ cm/s. The highest k of the $PrO_x$-LSCF electrode may suggest that $PrO_x$ is most active for oxygen exchange; however, the present hybrid catalyst-coated LSCF electrode showed the lowest $R_p$ in the symmetrical cell, suggesting that the overall rate of the cathode processes depends also on other factors such as the rate of ionic transport associated with ORR. The conformal coating of PNM plays a vital role in facilitating rapid oxygen-ion transport into LSCF, as to be elaborated later.

Shown in FIG. 6(c) are typical I-V-P curves of anode-supported cells (FIG. 7(c)) based on bare or catalyst-coated LSCF cathodes at 750° C. A peak power density ($P_{max}$) of 1.21 W/cm$^2$ was achieved for the cell with the present hybrid PNM-$PrO_x$ catalyst coated LSCF, much higher than 1.09 W/cm$^2$ for $PrO_x$-LSCF, 0.88 W/cm$^2$ for PNM-LSCF, and 0.79 W/cm$^2$ for bare LSCF. Shown in FIG. 6(d) are the power densities of the anode-supported cells with different cathodes operated at 750° C. under a constant cell voltage of 0.7 V for ~500 hours. Clearly, the cell having the present hybrid catalyst coated LSCF electrode showed not only the highest power density but also the best durability.

It should be mentioned that the performance increasing at initial stage (~110 hours) due most likely to the exsolution of nano $PrO_x$ particles (FIGS. 10(a) and 10(b)). The excellent durability after 110 hours in performance is attributed to the observed stability in morphology, composition, and structure of the present hybrid catalyst coated LSCF electrodes after long-term stability test (FIG. 10(c), FIG. 10(d), and FIGS. 11-13).

The Origin of Performance and Stability Enhancement

It is most likely that the two phases of the present hybrid catalyst, $PrO_x$ and PNM, contributed synergistically to the ORR activity and the durability of the cathodes. Oxygen can be readily incorporated through highly active $PrO_x$ particles. The cells with PNM coating showed an initially lower performance (compared with the $PrO_x$ coating and the present hybrid catalyst coating) but a significant activation behavior over time. The present hybrid catalyst coated-LSCF shows the lowest $R_p$, highest power output, and best stability among the cathode combinations studied, suggesting that the $PrO_x$ nano-particles dramatically facilitate the ORR kinetics, while the conformal thin PNM film enhances the stability. In order to test this hypothesis, the surface electronic structure and composition of the bare LSCF (~100 nm), PNM-, $PrO_x$— and the present hybrid catalyst (~10 nm)-coated LSCF (~100 nm) thin-film model electrode systems were probed using NAP-XPS and NEXAFS.

Fast ORR Kinetics: Surface Oxygen Vacancies and Charge Transfer Ability on $PrO_x$ The electron transfer from the cathode surface to the oxygen molecule is an important step for ORR. The density of states (DOS) near the Fermi level ($E_F$) is a simple descriptor used for characterizing the easiness of electron transfer. Z. H. Cai, Y. Kuru, J. W. Han, Y. Chen, B. Yildiz, J Am Chem Soc, 133 (2011) 17696-17704; and P. J. Feibelman, D. R. Hamann, Phys. Rev. Lett., 52 (1984) 61-64.

X-ray photo electron spectra of the valence band (VB) provide information about the filled states (FIG. 14(a)). The VB structure near Fermi level for bare LSCF, PNM-, $PrO_x$-, and the present hybrid catalyst-coated LSCF are shown in FIG. 14(b). Since the area of the VB spectra of all the samples was normalized to one, the intensity of the spectra represents the DOS in the VB. The DOS at $E_F$ for $PrO_x$-LSCF and the present hybrid-LSCF was higher than those for either bare LSCF or PNM-LSCF (FIG. 14(b)), indicating easier charge transfer from $PrO_x$-LSCF and the present hybrid-LSCF surface to absorbed oxygen molecules.

For SOFC cathodes, the concentration of oxygen vacancy is also a decisive factor for fast oxygen exchanges. M. Pavone, A. M. Ritzmann, E. A. Carter, Energy Environ. Sci., 4 (2011) 4933-4937; Y.-L. Lee, D. Lee, X. R. Wang, H. N. Lee, D. Morgan, Y. Shao-Horn, The Journal of Physical Chemistry Letters, 7 (2016) 244-249; Y. L. Lee, J. Kleis, J. Rossmeisl, Y. Shao-Horn, D. Morgan, Energy Environ. Sci., 4 (2011) 3966-3970; and Z. A. Feng, F. El Gabaly, X. Ye, Z.-X. Shen, W. C. Chueh, Nat Commun, 5 (2014).

The change in the x-ray absorption spectra (XAS) and the intensity near the $E_F$ in the VB spectra as a function of temperature indicated that oxygen vacancies are readily formed in $PrO_x$ at elevated temperature, suggesting that $PrO_x$ nano-particles are likely the active phase for ORR in the present hybrid catalyst-coated-LSCF cathodes.

The NEXAFS probes the unfilled electronic states. For bare LSCF, the feature i in the O K-edge XAS (FIG. 14(c)) is attributed to the unoccupied states of the O 2p- transition metal (TM) 3d hybridization band. With increasing temperature, more oxygen vacancies form at the LSCF surface, leading to the population of electronic states near the Fermi level, and so the $e_g$ absorption feature intensity decreases. The $t_{2g}$ absorption feature slightly increases, which is attributed to a change in the degree of covalency. Y. Orikasa, T. Ina, T. Nakao, A. Mineshige, K. Amezawa, M. Oishi, H. Arai, Z. Ogumi, Y. Uchimoto, Phys. Chem. Chem. Phys., 13 (2011) 16637-16643; and D. N. Mueller, M. L. Machala, H. Bluhm, W. C. Chueh, Nature Communications, 6 (2015).

Figure 15:
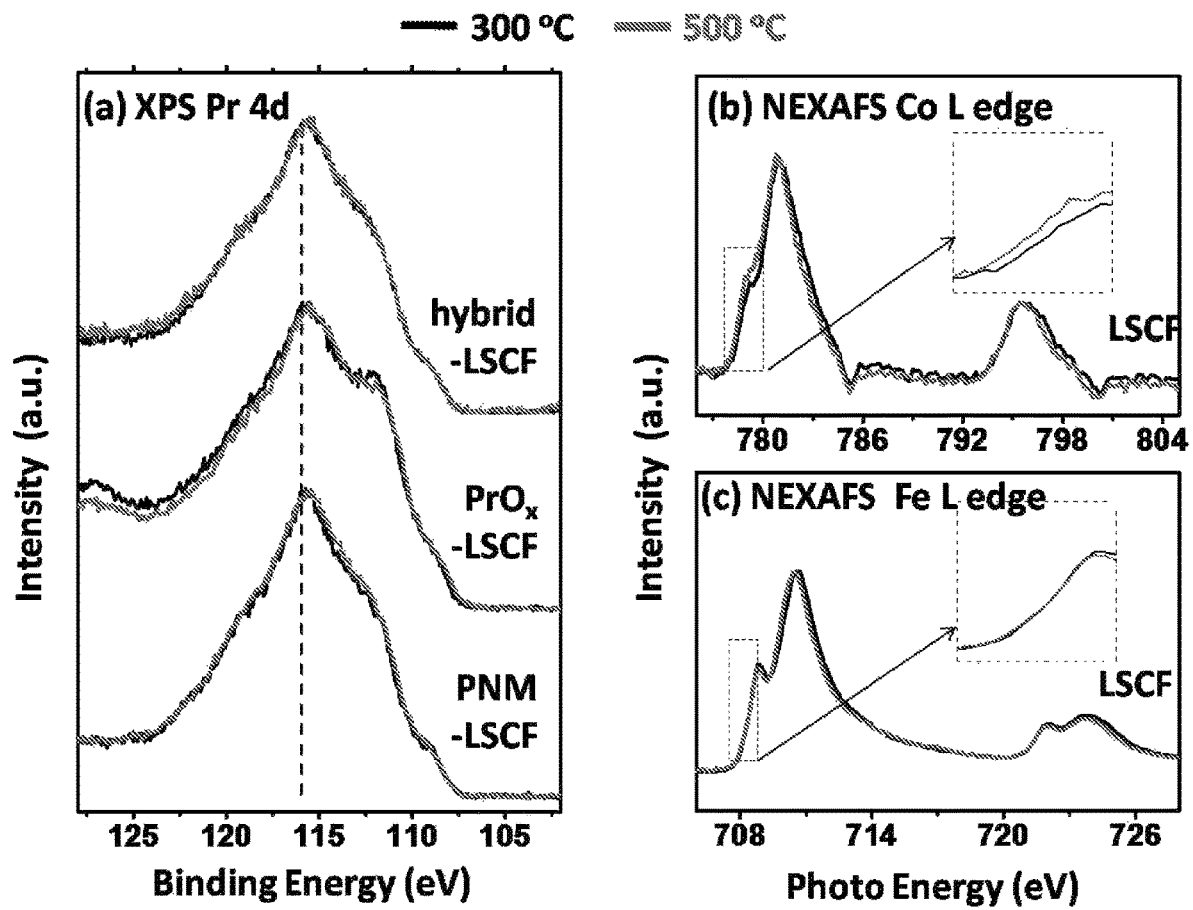

From the transition metal (TM) L-edge XAS, a slight reduction in the covalence state was observed, while the Fe valence state remained the same (FIG. 15). For $PrO_x$-LSCF, the O K-edge XAS (FIG. 14(c)) is similar to that of the cubic $PrO_x$, consistent with the cubic structure of $PrO_x$ quantified by XRD (FIGS. 3-4). Similar to LSCF, the intensity of the feature i in O K-edge XAS of the $PrO_x$-LSCF, corresponding to the Pr 4f-O2p hybridization band, decreased significantly with temperature. Such a decrease is likely due to the formation of oxygen vacancies which leave excess electrons filling into the unoccupied Pr 4f-O2p band. The change in the O K-edge XAS of the present hybrid PNM-$PrO_x$ catalyst coated-LSCF followed the same trend as that on the $PrO_x$-coated LSCF. The PNM-LSCF, on the other hand, did not show any detectable change in the O K edge XAS.

Consistent with change in O K edge XAS above, with increasing temperature the intensity near the Fermi level in the VB spectra of the $PrO_x$-LSCF increases and the top of VB shifts up towards the Fermi level (FIG. 14(b)). Such change is due likely to the formation of oxygen vacancies in the $PrO_x$-LSCF at high temperature, leading to creation of states near the Fermi level. The VB of the present hybrid PNM-$PrO_x$ coated LSCF followed the behavior of the VB of the $PrO_x$-LSCF, while the shift in the VB top is less on PNM-LSCF (FIG. 14(b)). Furthermore, both the Ni and Mn L edge spectra for the present hybrid catalyst (FIGS. 14(d) and 14(e)) did not show any noticeable variation with temperature, indicating no change in the Ni and Mn valence states. All these results indicate that the temperature-dependent changes of the VB structure and the O K-edge XAS of the present hybrid PNM-$PrO_x$ catalyst with temperature arises from the formation of oxygen vacancies in $PrO_x$. Based on oxygen vacancy availability as deduced from our XPS and XAS measurements, the $PrO_x$ is the active phase on the present hybrid catalyst coated LSCF surface for fast oxygen exchange process.

Enhanced Durability: Inherent Chemical Stability of the Present Hybrid Coating

To understand the mechanism for high stability of the present hybrid PNM-$PrO_x$ catalyst-coated LSCF, the surface chemistry of LSCF was investigated, the present hybrid catalyst, and the present hybrid catalyst coated LSCF model thin films exposed to reactive gas ($O_2$, $H_2O$) at elevated temperatures. All samples were first cleaned from carbon in 200 mtorr $O_2$ at 300° C., and then heated to 500° C. in $O_2$. Subsequently, 10% $H_2O$ was added to the $O_2$ gas environment while the temperature was kept at 500° C. Shown in FIG. 16 are the (La+Sr)/(Co+Fe) ratio for LSCF (quantified from La 3d, Sr 3d, Co 2p and Fe 2p peak area) and the Pr/(Ni+Mn) ratio for the present hybrid catalyst (quantified from Pr 4d, Ni 3p and Mn 3p) as a function of measurement conditions. Clearly, the (La+Sr)/(Co+Fe) ratio of LSCF increased significantly as the temperature was increased from 300 to 500° C. in $O_2$ or when 10% $H_2O$ was introduced at 500° C. In contrast, the Pr/(Ni+Mn) ratio of the present hybrid catalyst varied only slightly under similar conditions. Furthermore, the LSCF surface became much rougher by forming large precipitate particles accompanying the large increase in (La+Sr)/(Co+Fe) ratio of LSCF.

In contrast, the surface morphology of the present hybrid catalyst stayed nearly unchanged (FIG. 17). All these results prove that the present hybrid catalyst surface is more stable chemically than LSCF when exposed to the gases relevant to SOFC operation at high temperatures. O 1s, Sr 3d and Pr 4d photoelectron spectra provide further evidence to support that the present hybrid catalyst has better stability than LSCF (FIGS. 18-19).

Mechanism of ORR Acceleration Probed by Computation

Periodic density functional theory (DFT) simulations were performed to gain more insight into the mechanism of the enhanced ORR and stability on the present hybrid catalyst coating, by examining oxygen adsorption, vacancy formation and oxygen transport processes. Illustrated following, the strong oxygen adsorption and easier vacancy formation predicted by DFT calculations are consistent with the results obtained from XPS and XAS discussed hereinbefore. Furthermore, fast oxygen transport due to exsoluted $PrO_x$ particles and a more stable surface due to the conformal PNM coating can be expected based on these calculations, the latter being also consistent with the XPS results above.

The oxygen adsorption energy on $PrO_2$ and oxygen vacancy formation energy in $PrO_2$ using PBE+U was calculated, Y. Choi, M. C. Lin, M. Liu, Angewandte Chemie International Edition, 46 (2007) 7214-7219, and $CeO_2$ was taken as an excellent model catalyst reference for comparison.

TABLE 1

| | $PrO_2$ | $CeO_2$ | Remark |
|---|---|---|---|
| Lattice constants (Å) | a = b = c = 5.6716 | a = b = c = 5.4680 | Optimized GGA-PBE + U |
| Oxygen vacancy formation energy ($E_{OV}$) (eV) | 1.04 | 4.69 | $U_{eff}$ = 6.0 eV and 5.0 eV for $PrO_2$ and $CeO_2$, respectively, using the bulk models of $Pr_4O_8$ and $Ce_4O_8$. |
| Adsorption energy ($E_{ad}$) on M (eV) | −1.19 | ~0.00 | 18-atomic layers of (111) are used by fixing the bottom 9 layers. The surfaces are oxygen-terminated (4 oxygen atoms on the surfaces). |

TABLE 1 shows the calculated lattice constants, averaged oxygen vacancy formation energies of bulk $PrO_2$ and $CeO_2$, and the adsorption energy of $O_2$ on $PrO_2$ and $CeO_2$(111) surfaces. The calculated oxygen vacancy formation energies ($E_{VO}$) for bulk $PrO_2$ and $CeO_2$ (1.04 eV and 4.69 eV, respectively) as shown, as are the adsorption energy of $O_2$ on $PrO_2$(111) and $CeO_2$(111) surfaces (−1.19 and ~0.00 eV, respectively) with an end-on configuration. These quantities are characteristic of how fast the surface oxygen exchange and bulk oxygen diffusion kinetics are.

In comparison to $CeO_2$, the stronger $O_2$ adsorption and much lower oxygen vacancy formation energy ($E_{VO}$) of $PrO_2$ support the ease of oxygen uptake and the exceptional ORR kinetics on the $PrO_2$ surface under the cathodic conditions. Strong adsorption of oxygen molecule (presumably as chemisorption) on $PrO_x$ is consistent with the easier charge transfer found on $PrO_x$ by XAS and XPS above.

The calculated $E_{VO}$ for $PrO_x$ (1.04 eV) is much smaller than that of PNM (3.63 eV) and LSCF (2.38 eV) (TABLE 2). This is also consistent with the larger amount of oxygen vacancy found in $PrO_x$ from XPS and XAS measurements above.

TABLE 2

| | PNM | LSCF | Remark |
|---|---|---|---|
| Lattice constants (Å) | a = 5.5957<br>b = 7.5775<br>c = 5.4387 | a = 5.5745<br>b = 7.5488<br>c = 5.4181 | Orthorhombic type structures are used with $Pr_4Ni_2Mn_2O_{12}$ (PNM) and $La_2Sr_2Co_2Fe_2O_{12}$ (LSCF0.5) at GGA-PBE. |
| Oxygen vacancy formation energy (eV) | 3.63 | 2.38 | |

TABLE 2 shows the calculated lattice constants and averaged oxygen vacancy formation energies of bulk PNM and LSCF. Furthermore, a localized oxygen vacancy transport channel could be formed in the thin-film PNM phase during the $PrO_x$ exsolution process, allowing for fast oxygen transport through the $PrO_x$/PNM-LSCF electrode system. Localized growth of $PrO_x$ nano-particles (FIG. 6) may inevitably result in local Pr deficiency in the parent PNM coating. Migration barriers for oxygen diffusion were calculated to understand the effect of Pr deficiency in the PNM bulk phase, similar to a previous study.

The stoichiometric bulk PNM structure has a migration barrier ($E_m$) of 1.26 eV, while the structure with Pr deficiency has a much lower barrier of 0.45 eV (TABLE 3).

TABLE 3

| | Bulk structure without Pr segregation | Bulk structure with Pr segregation |
|---|---|---|
| Averaged oxygen vacancy formation energy (eV) | 3.63 | 1.17 |
| Migration energy (eV) | 1.26 | 0.45 |
| Bulk diffusion barrier (eV) | 4.89 | 1.62 |

TABLE 3 shows the calculated averaged oxygen vacancy formation energies ($E_{OV}$), migration energies ($E_m$), and bulk diffusion barriers ($E_a$) of bulk PNM*. (*Orthorhombic type structures were used with $Pr_4Ni_2Mn_2O_{12}$ and $Pr_3Ni_2Mn_2O_{12}$ at GGA-PBE).

More interestingly, the non-stoichiometric structure shows a smoothly curved vacancy trajectory, while the stoichiometric structure has a strong interaction between the vacancy and the neighboring ions (FIGS. 20(a)-(b)). The bulk diffusion barrier $E_a$ is the summation of a migration barrier ($E_m$) and oxygen vacancy formation energy ($E_{OV}$), as compiled in TABLE 3.

In effect, in this system the bulk diffusion barrier was lowered from 4.89 eV to 1.62 eV due to Pr deficiency (FIG. 21). The 67% lowering of the bulk diffusion barrier in Pr-deficient PNM supports the possibility of fast oxygen transport through the thin PNM layer. In addition, the migration energy of oxygen from the $PrO_x$ surface into the Pr-deficient PNM subsurface was examined. To simplify the problem, the $PrO_x$-terminated surface of PNM was assessed to represent the oxygen transfer from $PrO_x$ particles into PNM. The surface energy calculations show that PrO-terminated surfaces are more stable than Ni and Mn-terminated ones.

Figure 22:
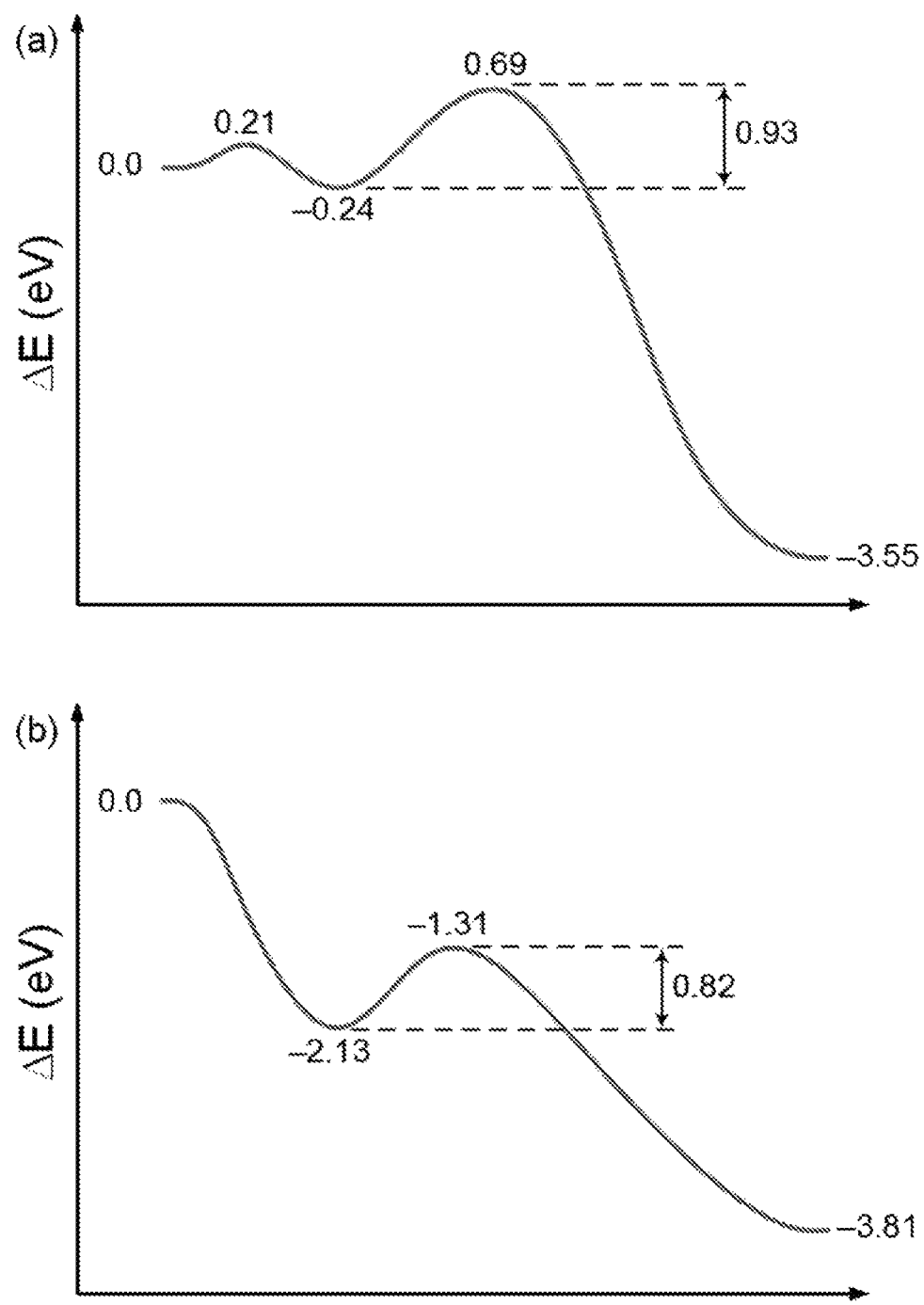

As shown in FIG. 22, for the configuration without Pr deficiency in PNM, a 0.21 eV barrier is required to diffuse into the sub-surface, followed by overcoming a migration barrier of 0.93 eV to reach the oxygen vacancy. However, for the case with Pr deficiency in the PNM, oxygen is instantaneously incorporated into the sub-surface without a barrier, and then it hops by overcoming a 0.82 eV barrier. The 12% reduction in the migration barrier and the non-existence of the incorporation barrier clearly manifests that Pr deficiency in PNM could be a critical factor in enhancing the oxygen transport into and through the bulk layers.

Overall, on the basis of the surface and bulk calculations, the enhanced ORR and fast bulk diffusion of the present hybrid catalyst coated LSCF cathode is illustrated in FIG. 20(c). Gas-phase oxygen adsorbs either preferentially on $PrO_x$ nano-particles or on the $PrO_x$-terminated surfaces of PNM, followed by dissociation. Subsequently, monoatomic oxygen diffuses through the $PrO_x$ surface or the $PrO_x$ bulk, migrating down into PNM and to the cathode/electrolyte interface.

Finally, the lattice mismatch between PNM and LSCF is only 0.4%, allowing the formation of a conformal PNM coating on LSCF (as shown in FIG. 5(c)), and the PNM layer protects the surface against chemical degradation. The segregation and phase precipitation of the A-site elements (e.g., Sr) are well accepted in literature to be detrimental to the performance of LSCF and perovskite-related materials. Y. Chen, W. C. Jung, Z. Cai, J. J. Kim, H. Tuller, B. Yildiz, Energy Environ. Sci., 5 (2012) 7979-7988; and J. W. Han, B. Yildiz, Energy Environ. Sci., 5 (2012) 8598-8607. Indeed, the continuous degradation in LSCF performance (FIG. 6(d)) is attributed to Sr segregation on LSCF as shown in FIG. 16.

One driving force for Sr segregation is the net positive charge at the surface due to the preferential formation of oxygen vacancies. The coverage by a conformal hybrid catalyst layer with high oxygen vacancy formation energy (TABLE 2) can suppress the oxygen vacancy concentration at the LSCF/PNM interface, and in turn decrease the driving force for Sr segregation. Consistent with this argument, the present hybrid catalyst surface was found much more stable than the LSCF surface, both electrochemically (FIG. 6) and chemically (FIG. 16) when exposed to reactive gases at high temperatures.

In summary, both the ORR activity and the stability of state-of-the-art LSCF cathode have been effectively enhanced through surface modification by an electrocatalytically active and robust hybrid catalyst coating composed of a conformal PNM film and exsoluted $PrO_x$ nano-particles. The dispersed $PrO_x$ nano-particles significantly accelerate the ORR kinetics because of the easier electron transfer and a larger concentration of oxygen vacancies at the surface.

The inherently more stable PNM film greatly enhances the durability of the cathode by suppressing Sr segregation from LSCF. The combination of distinctive properties of the two separate phases, together with their unique morphology and architecture, provide a dramatic enhancement in electrocatalytic performance and long-term durability of a state-of-the-art electrode backbone. The process involves a simple, one-step surface modification. The demonstrated approach of surface enhancement is attractive not only for intermediate-temperature SOFCs, but also for other types of energy conversion and storage systems, including electrolysis cells for hydrogen production and membrane reactors for synthesis of clean fuels.

Experiments

Figure 1:
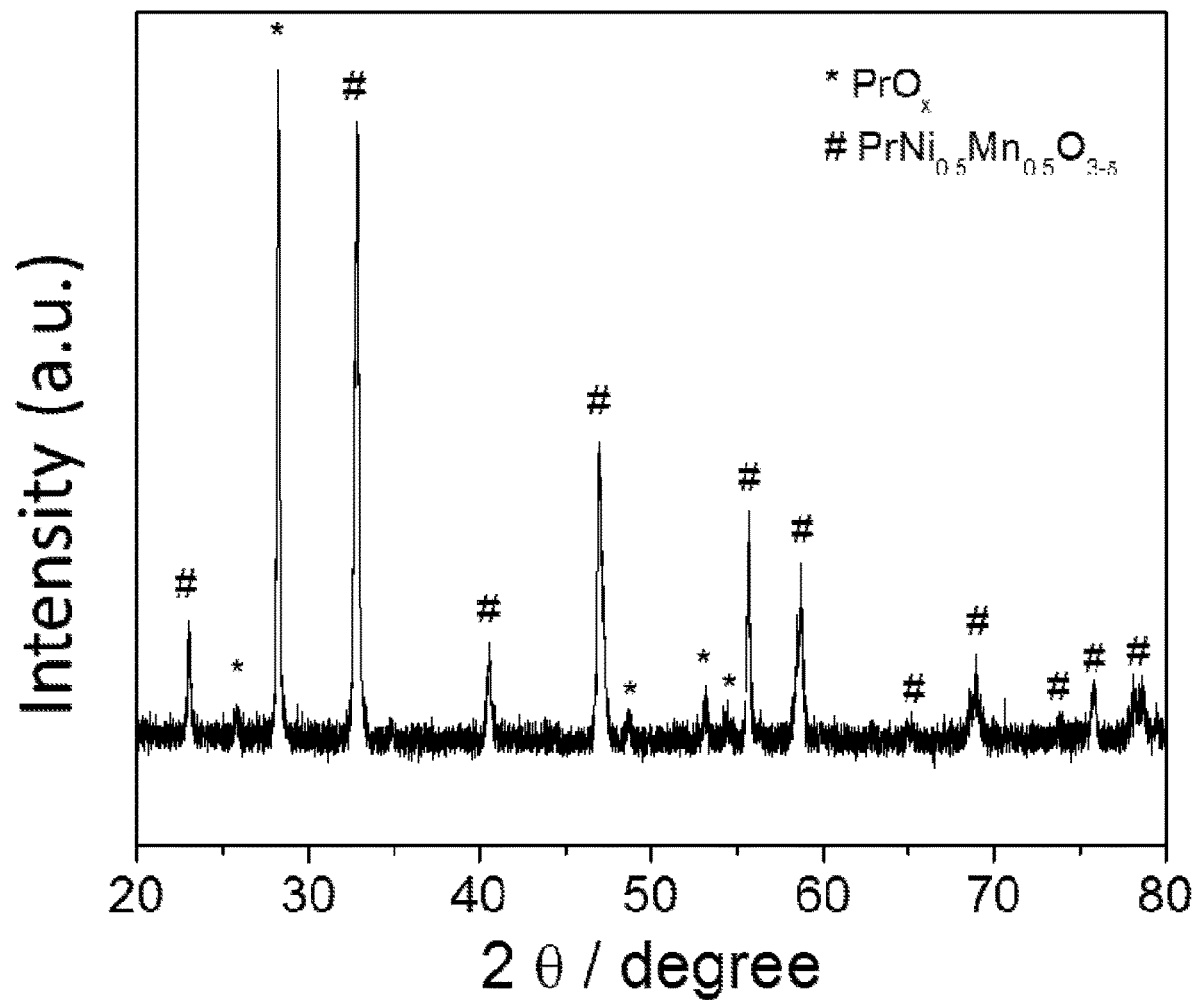
FIG. 1 is an x-ray diffraction pattern (XRD pattern) plot of the intensity of x-rays scattered at different angles by a powder mixture derived from a glycine nitrate process, followed by firing at 800° C. in air for five hours. The mixture was composed of $PrO_x$ ($Pr_7O_{12}$, PDF #01-071-0341) and PNM (a derivate from $PrMnO_3$, PDF #01-085-2202).

Preparation Of PNM, $PrO_x$ And The Present Hybrid Coating Solution For Infiltration:

Stoichiometric amounts of high-purity praseodymium nitrate hydrate, nickel nitrate hydrate, manganese nitrate hydrate (all from Alfa Aesar) were dissolved in DI water/ethanol mixture (volume ration is 1:1) to form 0.1M $Pr_2Ni_{0.5}Mn_{0.5}O_{4+\delta}$ (intended formula), $PrNi_{0.5}Mn_{0.5}MnO_3$ (PNM) and $Pr(NO_3)_3$ solution. 5 wt. % polyvinyl pyrrolidone (PVP) were added to the solution as a surfactant and a stoichiometric amount of glycine was added as a complexing agent and the fuel for subsequent self-combustion. 5 µL of the stock solution was deposited on the porous LSCF cathode surface. The coatings were fired at 800° C. for one hour during the cell start-up stage. The PNM powder was prepared by solution combustion method. The ash was then fired at 800° C. for five hour. The phase compositions of PNM powders was determined by XRD (FIG. 1).

Fabrication and Characterization of PLD Model Thin Films:

To avoid the complication introduced by the surface microstructure, thin films prepared by PLD were used as a model system instead of porous electrode. LSCF thin film covered by a $PrO_x$, PNM and the present hybrid catalyst thin layer, with a thickness of around 10 nm were grown on 8 mol % $Y_2O_3$-doped $ZrO_2$ (YSZ) (001) single crystal substrate. The PLD growth were carried out at 700° C. under oxygen pressure of 10 mTorr. A KrF excimer laser with a wavelength of 248 nm, energy of 400 mJ per pulse and a pulse frequency of 10 Hz was used for the deposition. The target substrate distance was set to be 7 cm. The films were cooled down to room temperature in 2 torr oxygen pressure with a cooling rate of 5° C./min. A GDC buffer layer was deposited between YSZ and LSCF to avoid the undesired chemical reactions. $PrO_x$, PNM and LSCF and hybrid single layers were also grown under the same condition for comparison. As shown in FIGS. 2-3, the PLD thin films were representative to the present hybrid catalyst coated LSCF porous cathodes.

The NAP-XPS and NEXAFS were carried out at Beamline 11.0.2 and Beamline 9.0.3 in partial electron yield detection mode at the Advanced Light Source, Berkeley. Before all the characterization, the samples were heated at 300° C. in 200 mtorr oxygen for one hour to remove carbon contamination.

Fabrication of Symmetrical Cells and Single Cells:

YSZ pellets were prepared by uniaxially pressing commercially available YSZ powders (Daiichi Kigenso, Japan) followed by sintering at 1450° C. for five hours to achieve relative density of ~98%. LSCF (Fuelcell Materials, US) green tapes were prepared by tape-casting, which were then bound onto both sides of a YSZ electrolyte pellet using a slurry of SDC (function also as buffer layer). It is noted that GDC was used as buffer layer in the fabrication of thin film model cells. In both cases, a thin layer of ceria oxides (either GDC or SDC) were used as a buffer to prevent chemical reactions between YSZ electrolyte and LSCF cathode at high temperatures. The cells were then co-fired at 1080° C. for two hours to form porous LSCF electrodes (with an area of 0.316 $cm^2$) on YSZ. The SDC powder was synthesized using a chemical co-precipitation process. The SDC powder was then dispersed in acetone with V-006A (Heraeus, US) as binder and ball-milled for 24 hours to form a stable SDC slurry.

Fabrication of Anode-Supported Full Cells:

Tape-casted NiO/YSZ anode support was first fabricated and pre-fired at 850° C. for two hours. Then, a NiO/YSZ functional layer (~15 µm) and a YSZ electrolyte (~15 µm) were sequentially deposited on the anode support by a particle suspension coating process followed by co-firing at 1400° C. for five hours. The LSCF cathode was then applied to the YSZ electrolyte using the same procedures as described earlier for the fabrication of symmetrical cells.

Characterization of Phase Composition and Microstructure of Cathodes:

Raman spectroscopy (Renishaw RM1000) was performed using 514 nm laser excitation on mixed bare LSCF and PNM-LSCF electrode before and after testing at 750° C. for 550 hours. The microstructure and morphology of the LSCF pellets with/without catalysts coatings were examined using a scanning electron microscope (SEM, LEO 1530). The electronic structures of surface elements were characterized using x-ray photoelectron spectroscopy (Thermo K-Alpha XPS, Thermo Fisher Scientific).

Electrochemical Measurements:

The area specific resistances (ASR) of cathodes were measured in a two electrode symmetric cell configuration using two pieces of Ag mesh as current collector (without Pt paste to avoid its possible contribution to catalytic activity) at 500-800° C. Impedance spectra were acquired using a Solartron 1255 HF frequency response analyzer interfaced with an EG&G PAR potentiostat model 273A with an AC amplitude of 10 mV in the frequency range from 100 kHz to 0.01 Hz. The button cells were mounted on an alumina supporting tube for fuel cell testing at 750° C. with humidified hydrogen (3% $H_2O$) as the fuel and ambient air as the oxidant. The cell performance was monitored with an Arbin multi-channel electrochemical testing system (MSTAT).

Computational Method:

Periodic density functional theory (DFT) calculations were carried out using the Vienna ab initio simulation package (VASP) with the projector-augmented-wave (PAW) method. Because the concurrent optimization of two effective U parameters ($U_{eff}$) of two B-site cations such as LSCF and PNM could result in incorrect results, we performed the spin-polarization method with the generalized gradient approximation (GGA) with using the Perdew-Burke-Ernzerhof (PBE) exchange-correlation functional for LSCF and PNM. However, the PBE+U approach was applied for the comparison of the bulk and surface properties of fluorite-structure $CeO_2$ and $PrO_2$ to accurately describe the strong on-site Coulomb repulsion of the Ce and Pr 4f electrons with $U_{eff}$=5.0 eV and 6.0 eV. An orthorhombic structure was constructed with a kinetic energy cutoff for a plane wave basis set of 415 eV to simulate the oxygen-deficient perovskite LSCF and PNM. Monkhorst-Pack meshes with the (3×3×3) and (3×3×1) were used for bulk and surface calculations, respectively.

TABLE 2 summarizes the optimized lattice constants of LSCF and PNM. In this study, LSCF was built to understand the full coating of PNM on the LSCF cathode. To obtain the most probable surface, the surface stability of PNM(110) was examined since it was reported that ionic diffusion may take place most likely in the (110) direction. The slabs for the 2-D surface calculations were separated by a vacuum space of 15 Å.

TABLE 4

| | Surface energy (J/m³) |
|---|---|
| Mn—PrO—Ni—PrO | −2.04 |
| Ni—PrO—Mn—PrO | −3.02 |
| PrO—Mn—PrO—Ni | −3.24 |
| PrO—Ni—PrO—Mn | −3.38 |

TABLE 4 shows the calculated surface energies of PNM (110)*(*PNM(110) of $Pr_{12}Ni_6Mn_6O_{16}$ was applied with the vacuum space of 10 Å. The surface energies were calculated similar to a previous study).

As summarized in TABLE 4, four types of PNM(110) are available, including Mn—PrO—Ni—PrO, Ni—PrO—Mn—PrO, PrO—Mn—PrO—Ni, and PrO—Ni—PrO—Mn. For this qualitative examination, one monolayer of $PrO_x$ was deposited on PrO—Ni—PrO—Mn-terminated PNM (110) (FIGS. 23-24). Highly CPU-demanding optimization followed by transition-search calculations estimated that dissociated oxygen is incorporated an oxygen vacancy on the surface, and then reaches an oxygen vacancy site in the bulk phase. In this study, the oxygen-vacancy formation energy ($E_{OV}$) was calculated by $E_{OV}$=E[defective surface]+½E[$O_2$]−E[perfect surface], where E[defective surface], E[perfect surface], and E[$O_2$] are the predicted electronic energies for defective and perfect bulk structures and a gas-phase triplet $O_2$, respectively. The adsorption energy ($E_{ad}$) of $O_2$ on a surface was calculated by $E_{ad}$=E[$O_2$-surface]−E[surface]−E[$O_2$], where E[$O_2$-surface] and E[surface] are the predicted electronic energies for an adsorbed $O_2$ species on a surface and a bare surface, respectively. Bulk diffusion barriers of $E_a$ were calculated by $E_a$=$E_m$+$E_{OV}$, where $E_m$ is a migration barrier of an oxygen ion through bulk phases. $E_m$ was determined by the climbing image-nudged elastic band (CI-NEB) method.

The dotted line in FIG. 4(a) highlights the interface between the LSCF and PNM. The coated PNM layer is around 10 nm thick. The epitaxial relationship between the PNM and LSCF can be clearly seen in the HRTEM image. The SAED patterns in the right-top and right-bottom come from the pure LSCF grain and the interface area, respectively. The arrowheads marked the superlattice diffraction spots come from the PNM phase. Although domains can be identified in the PNM film layer as revealed by the FFT from different thin film areas, both the LSCF and PNM share the same primary perovskite structure, which is corresponding to the strong diffraction spots in the SAED patterns.

FIG. 4(b) shows the selected-area electron diffraction (SAED) patterns from $[010]_p$, $[0\bar{1}1]_p$ and $[1\bar{1}\bar{1}]_p$ electron-beam directions. The top three SAED patterns are solely from a LSCF grain, while the bottom three ones are from the epitaxial thin film area containing both LSCF and PNM grains. The subscript "p" means the primary perovskite unit cell. FIG. 4(c) shows the HAADF-STEM image of LSCF with a PNM coating: before and after annealing at 800° C. for 500 hours. The EELS and EDS analyses indicated that little diffusion was occurred between the catalyst layer (10 nm thick) and the LSCF backbone.

FIG. 4(d) shows the unit cells of PNM and LSCF in reciprocal space. PNM is an orthorhombic structure (Space group: P n m a, Space group number: 62, with a=5.3950 Å, b=7.6520 Å, and c=5.4460 Å. FIG. 4(e) shows the typical Raman spectra collected in air at room temperature for the cell (before and after test) with bare LSCF and PNM-coated LSCF. The bare LSCF electrode exhibits no obvious Raman bands since the vibration modes of pristine orthorhombic LSCF are not Raman active. The distortion could be preliminarily viewed as the unwanted structural change which may cause the gradual performance degradation. The pristine PNM-coated LSCF exhibited two obvious bands which contributed by active PNM surface coating. The band at ~650 $cm^{-1}$ can be considered as the vibration of Mn—O bond in PNM lattice, whereas the band at 524 $cm^{-1}$ is result of Pr—O vibration in PNM lattice. After the cell test, the Raman bands of PNM coating present no observable changes. Also, no new bands corresponding to the LSCF substrate can be found, suggesting the structural stability and robustness of PNM-coated LSCF.

ECR Measurement

The surface exchange kinetics of catalyst coated LSCF were evaluated through ECR measurement. Dense LSCF bar pellets were achieved by dry-pressing the commercial LSCF powders at 300 MPa and sintering at 1250° C. for five hours (the relative density>95%). The sintered bars were polished by 1200 mesh SiC attrition paper to the dimension of approximately 2×2×13 mm and ultrasonically cleaned in ethanol. The catalyst solutions (0.01 M, nitrate precursor and glycine dissolved in 50 vol % ethanol–50 vol % water solution) were coated on the entire polished surface with a firing process of 800° C. for two hours with a projected coating thickness of 10 nm, estimated from $$L = \frac{VCM}{\rho S}$$

where V is the volume of the solution, C is the solution concentration, M is the molar weight of the catalyst used for coating, p is the theoretical density of the infiltration material, and S is the surface area of LSCF bar that was coated with the solution.

The electrical conductivity was measured by the four probe DC method. A constant current (10 mA) was delivered to the two current wires, and the voltage response was recorded by a potentiostat instrument (MSTAT). Measurements were performed over the temperature range of 600–700° C. The sample was then heated to 750° C. and held for one hour for equilibrium. The gas $p_{O2}$ was varied by diluting the oxygen stream with argon (Ultra-pure grade, 99.999%, Airgas, Ga., USA) gas switching between two streams at the same measured flow rate was performed using a four-way valve connected to the inlet line. The flow rate was maintained at 290 mL/min.

In the ECR technique, the total conductivity of the sample is measured during an instantaneous step change in oxygen partial pressure ($p_{O2}$) at constant temperature. The gas $p_{O2}$ was varied by diluting the oxygen stream with nitrogen. The gas pathways were included in the system, each with oxygen stream based argon stream, such that two different $p_{O2}$ values could be simultaneously achieved. The gas flow rates for each $p_{O2}$ stream were set with mass flow controllers. The change in electronic conductivity is directly related to $p_{O2}$ through a proportional change in the concentration of charge carriers. For p-type conductors, the concentration of electron holes decreases directly with $p_{O2}$, resulting in decreased electronic conductivity as the bulk oxygen non-stoichiometry increases. The conductivity was normalized for each $p_{O2}$ switch according to Eq. (1) and was fit to a solution of Fick's second law (Eqs. 2-4). The variable parameters in the fit are the surface exchange coefficient, $k_{chem}$, measured in cm/s, and the bulk diffusion coefficient, $D_{chem}$, measured in cm$^2$/s.

$$\sigma_n = \frac{\sigma_t - \sigma_0}{\sigma_\infty - \sigma_0} \quad (1)$$

$$\sigma_n = \quad (2)$$

$$1 - \sum_{m=1}^{\infty}\sum_{n=1}^{\infty}\sum_{p=1}^{\infty} \frac{2L_\beta^2 \exp\left(\frac{-\beta_m^2 D_{chem} t}{x^2}\right)}{\beta_m^2(\beta_m^2 + L_\beta^2 + L_\beta)} \times \frac{2L_\gamma^2 \exp\left(\frac{-\gamma_n^2 D_{chem} t}{y^2}\right)}{\gamma_n^2(\gamma_n^2 + L_\gamma^2 + L_\gamma)} \times$$

$$\frac{2L_\phi^2 \exp\left(\frac{-\phi_p^2 D_{chem} t}{z^2}\right)}{\phi_p^2(\phi_p^2 + L_\phi^2 + L_\phi)}$$

$$L_\beta = x\frac{k_{chem}}{D_{chem}}; L_\gamma = y\frac{k_{chem}}{D_{chem}}; L_\phi = z\frac{k_{chem}}{D_{chem}} \quad (3)$$

$$\beta_m \tan\beta_m = L_\beta; \gamma_n \tan\gamma_n = L_\gamma; \phi_p \tan\phi_p = L_\phi \quad (4)$$

where t is time in seconds; $\sigma_n$ is normalized conductivity (relative conductivity, g(t)), $\sigma_t$ is instantaneous conductivity at time t, so is initial conductivity and $\sigma_\infty$ is conductivity at equilibrium for a given $p_{O2}$; x, y, z are dimensions of the sample in centimeters, and $\beta_m$, $\gamma_n$, $\Phi_p$ are the positive, non-zero roots of Eq. (4). All calculations are carried out with ECRTOOLS a freely available MATLAB toolbox which allows the estimation of k and D from ECR data, the evaluation of the quality of the estimated parameters.

For the electrical conductivity measurement, the experimental temperature was adjusted over the range from 300 to 900° C. At each temperature point, a cumulative current load was applied to the two current wires, and the corresponding voltage response on the two voltage wires was recorded with a potentiostat instrument and EG&G 5210 amplifier. Electrical conductivity values were then calculated from the slope of the obtained straight line. As for the determination of D and k, ECR was conducted between 550 and 750° C. at an interval of 50° C. The bars were first stabilized at the given temperatures for approximately one hour to ensure that they completely equilibrated with the surrounding atmosphere ($p_{O2}$=0.21 atm), which was then abruptly switched to an alternative atmosphere ($p_{O2}$=0.1 atm), thereby leading to a change in electrical conductivity. The change in conductivity with time was plotted as $[\sigma(t)-\sigma(0)]/[\sigma(\infty)-\sigma(0)]$. Oxygen surface exchange coefficient (k) was calculated from the ECR curves by ECRTOOLS.

In the first ~110 hours of testing, it appears that more $PrO_x$ particles were exsolved from the parental coating, which is beneficial to the performance enhancement since the oxygen-vacancy-rich surfaces of $PrO_x$ nano-particles may accelerate the rate of ORR. After 110 hours of testing however, the morphology became reasonably stable, which is consistent with the observation that the power output became stable after ~110 hours of operation (FIG. 6(d)).

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. An electrode comprising:
    a mixed ionic-electronic conductor; and
    an oxygen-reducing catalyst coating on at least a portion of the conductor;
    wherein the catalyst coating comprises a conformal perovskite film and particles exsoluted from the perovskite film;
    wherein at 750° C., the electrode has a polarization resistance of less than 0.068 $\Omega$cm$^2$; and
    wherein the catalyst coating has a thickness in a range from about 1 to about 20 nm.

2. The electrode of claim 1, wherein the conformal perovskite film comprises a composition comprising praseodymium, oxygen, at least two transition metals.

3. The electrode of claim 2, wherein the composition further comprises an alkaline earth metal selected from the group consisting of calcium, strontium, and barium;
    wherein one of the transition metals is manganese; and
    wherein another of the transition metals is selected from the group consisting of nickel, cobalt, and iron.

4. The electrode of claim 3, wherein the conformal perovskite film comprises $Pr_{2-x}B_xNi_yMn_{1-y}O_{4+\delta}$;
    wherein $0 \leq \delta \leq 1$;
    wherein $0 \leq x \leq 2$; and
    wherein $0 \leq y \leq 1$.

5. The electrode of claim 4, wherein the B is replaced by an element selected from the group consisting of calcium, strontium, and barium.

6. The electrode of claim 1, wherein the particles exsoluted from the perovskite film comprise $PrO_x$ nano-particles.

7. The electrode of claim 6, wherein the particles exsoluted from the perovskite film comprise particles selected from the group consisting of $PrO_2$ nano-particles and $Pr_7O_{12}$ nano-particles.

8. The electrode of claim 1, wherein the catalyst coating has a thickness in a range from about 1 to about 10 nm.

9. The electrode of claim 1, wherein the conformal perovskite film comprises a composition selected from the group consisting of $PrNi_{0.5}Mn_{0.5}O_3$ and $Pr_2Ni_{0.5}Mn_{0.5}O_4$.

10. A solid oxide fuel cell comprising:
an anode;
a cathode comprising the electrode of claim 1; and
an electrolyte adjacent the anode and the catalyst coating of the cathode.

11. The solid oxide fuel cell of claim 10, wherein the catalyst coating has a thickness of about 10 nm.

12. The solid oxide fuel cell of claim 10, wherein the cathode has a peak power density of greater than 0.88 $W/cm^2$; and
wherein the cathode has a surface exchange coefficient of greater than $5.7 \times 10^{-4}$ cm/s.

13. The electrode of claim 1, wherein the electrode has a peak power density of greater than 0.88 $W/cm^2$.

14. The electrode of claim 1, wherein the electrode has a surface exchange coefficient of greater than $5.7 \times 10^{-4}$ cm/s.

15. An electrode comprising:
a mixed ionic-electronic conductor; and
an oxygen-reducing catalyst coating on at least a portion of the conductor;
wherein the catalyst coating comprises a conformal perovskite film and particles exsoluted from the perovskite film;
wherein the catalyst coating has a thickness in a range from about 1 to about 20 nm; and
wherein the electrode has a surface exchange coefficient of greater than $5.7 \times 10^{-4}$ cm/s.

16. The electrode of claim 15, wherein at 750° C., the electrode has a polarization resistance of less than 0.068 $\Omega cm^2$.

17. The electrode of claim 15, wherein the conformal perovskite film comprises a composition comprising praseodymium, oxygen, at least two transition metals.

18. The electrode of claim 17, wherein the composition further comprises an alkaline earth metal selected from the group consisting of calcium, strontium, and barium;
wherein one of the transition metals is manganese; and
wherein another of the transition metals is selected from the group consisting of nickel, cobalt, and iron.

19. The electrode of claim 18, wherein the conformal perovskite film comprises $Pr_{2-x}B_xNi_yMn_{1-y}O_{4+\delta}$;
wherein $0 \leq \delta \leq 1$;
wherein $0 \leq x \leq 2$; and
wherein $0 \leq y \leq 1$.

20. The electrode of claim 19, wherein the B is replaced by an element selected from the group consisting of calcium, strontium, and barium.

21. The electrode of claim 15, wherein the particles exsoluted from the perovskite film comprise $PrO_x$ nano-particles.

22. The electrode of claim 21, wherein the particles exsoluted from the perovskite film comprise particles selected from the group consisting of $PrO_2$ nano-particles and $Pr_7O_{12}$ nano-particles.

23. The electrode of claim 15, wherein the catalyst coating has a thickness in a range from about 1 to about 10 nm.

24. The electrode of claim 15, wherein the conformal perovskite film comprises a composition selected from the group consisting of $PrNi_{0.5}Mn_{0.5}O_3$ and $Pr_2Ni_{0.5}Mn_{0.5}O_4$.

25. The electrode of claim 15, wherein the electrode has a peak power density of greater than 0.88 $W/cm^2$.

26. A solid oxide fuel cell comprising:
an anode;
a cathode comprising the electrode of claim 15; and
an electrolyte adjacent the anode and the catalyst coating of the cathode.

27. The solid oxide fuel cell of claim 26, wherein the catalyst coating has a thickness of about 10 nm.

28. The solid oxide fuel cell of claim 26, wherein the cathode has a peak power density of greater than 0.88 $W/cm^2$; and
wherein the cathode has a surface exchange coefficient of greater than $5.7 \times 10^{-4}$ cm/s.

29. An electrode comprising:
a mixed ionic-electronic conductor comprising lanthanum strontium cobalt ferrite (LSCF); and
an oxygen-reducing catalyst coating introduced on at least a portion of the conductor via solution infiltration;
wherein the catalyst coating comprises a conformal perovskite film and particles exsoluted from the perovskite film;
wherein at 750° C., the electrode has a polarization resistance of less than 0.068 $\Omega cm^2$;
wherein the electrode has a peak power density of greater than 0.88 $W/cm^2$;
wherein the electrode has a surface exchange coefficient of greater than $5.7 \times 10^{-4}$ cm/s; and
wherein the catalyst coating has a thickness in a range from about 1 to about 50 nm.

30. The electrode of claim 29, wherein the catalyst coating is a conformal perovskite film of $PrNi_{0.5}Mn_{0.5}O_3$ coating decomposed from $Pr_2Ni_{0.5}Mn_{0.5}O_4$ by nitrite precursors, with the particles comprising exsolved $PrO_x$ nano-particles during an annealing process.

31. The electrode of claim 29, wherein the catalyst coating is a conformal perovskite film of $PrNi_{0.5}Mn_{0.5}O_3$ with the particles comprising exsolved $PrO_x$ nano-particles; and
wherein the catalyst coating has a thickness in a range from about 1 to about 20 nm.

32. The electrode of claim 29, wherein the conformal perovskite film comprises a composition comprising:
praseodymium;
oxygen;
manganese;
at least one other transition metal selected from the group consisting of nickel, cobalt, and iron; and
an alkaline earth metal selected from the group consisting of calcium, strontium, and barium.

33. The electrode of claim 32, wherein the conformal perovskite film comprises $Pr_{2-x}B_xNi_yMn_{1-y}O_{4+\delta}$;
wherein $0 \leq \delta \leq 1$;
wherein $0 \leq x \leq 2$; and
wherein $0 \leq y \leq 1$.

* * * * *